US011243669B2

(12) United States Patent
Bax et al.

(10) Patent No.: US 11,243,669 B2
(45) Date of Patent: Feb. 8, 2022

(54) TRANSMITTING RESPONSE CONTENT ITEMS

(71) Applicant: Oath Inc., New York, NY (US)

(72) Inventors: Eric Theodore Bax, Sierra Madre, CA (US); Kimberly Williams, Burbank, CA (US); Lisa Giaffo, Pasadena, CA (US); John Donald, Los Angeles, CA (US); Teppo Veikko Salonen, Temple City, CA (US)

(73) Assignee: VERIZON MEDIA INC., New York, NY (US)

( * ) Notice: Subject to any disclaimer, the term of this patent is extended or adjusted under 35 U.S.C. 154(b) by 219 days.

(21) Appl. No.: 15/906,118

(22) Filed: Feb. 27, 2018

(65) Prior Publication Data

US 2019/0265852 A1     Aug. 29, 2019

(51) Int. Cl.
| | | |
|---|---|---|
| *G06F 3/0484* | (2013.01) | |
| *G06F 3/0482* | (2013.01) | |
| *G06F 16/28* | (2019.01) | |
| *G06F 16/9535* | (2019.01) | |

(52) U.S. Cl.
CPC .......... *G06F 3/0484* (2013.01); *G06F 3/0482* (2013.01); *G06F 16/287* (2019.01); *G06F 16/9535* (2019.01)

(58) Field of Classification Search
CPC .. G06F 3/0484; G06F 16/287; G06F 16/9535; G06F 3/0482
See application file for complete search history.

(56) References Cited

U.S. PATENT DOCUMENTS

| | | | | |
|---|---|---|---|---|
| 5,603,025 A | * | 2/1997 | Tabb | G06F 16/94 |
| 6,925,441 B1 | * | 8/2005 | Jones, III | G06Q 10/06375 |
| | | | | 705/7.33 |
| 7,472,072 B2 | * | 12/2008 | Kowalchuk | G06Q 30/02 |
| | | | | 705/7.32 |
| 7,599,851 B2 | * | 10/2009 | Frengut | G06Q 30/02 |
| | | | | 705/14.66 |

(Continued)

OTHER PUBLICATIONS

Beginner's Guide to Using MailChimp For Email Marketing by Nick Schaferhoff (see https://torquemag.io/2015/07/beginners-guide-using-mailchimp-email-marketing/; pub date: Jul. 7, 2015; downloaded on Aug. 27, 2020) (hereinafter MailChimpGuide), (Year: 2015).*

(Continued)

*Primary Examiner* — Jung-Mu T Chuang
(74) *Attorney, Agent, or Firm* — Cooper Legal Group, LLC

(57) ABSTRACT

One or more computing devices, systems, and/or methods for transmitting response content items to devices are presented. For example, a graphical user interface may be controlled to display an interface. The targeting interface may comprise a selectable input. The selectable input may correspond to a content item. A request for a targeted response to the content item may be received via the interface. The request may comprise a response content item and a selection of the selectable input. A plurality of assignments of the content item to a plurality of users may be determined. The response content item may be transmitted to a plurality of devices. Each device of the plurality of devices may be associated with a user of the plurality of users.

20 Claims, 17 Drawing Sheets

(56) References Cited

U.S. PATENT DOCUMENTS

| | | | |
|---|---|---|---|
| 7,624,341 B2* | 11/2009 | Salmon | G06F 16/3323 715/255 |
| 7,870,026 B2* | 1/2011 | Krishnan | G06Q 30/02 705/14.16 |
| 8,099,317 B2* | 1/2012 | Moukas | G06Q 10/0631 705/7.29 |
| 8,171,034 B2* | 5/2012 | Dean | G06Q 30/02 707/748 |
| 8,255,948 B1* | 8/2012 | Black | H04N 21/234336 709/219 |
| 8,316,020 B1* | 11/2012 | Kleinmann | G06F 16/437 707/734 |
| 8,429,011 B2* | 4/2013 | Newton | G06Q 30/0224 705/14.4 |
| 8,554,630 B2* | 10/2013 | Grant | G06Q 20/10 705/14.73 |
| 8,763,033 B2* | 6/2014 | Dittus | G06Q 30/0255 725/34 |
| 9,071,859 B2* | 6/2015 | Lajoie | G06Q 30/02 |
| 9,092,805 B2* | 7/2015 | Dittus | G06Q 30/0269 |
| 9,569,785 B2* | 2/2017 | Alon | G06Q 30/0202 |
| 9,596,317 B2* | 3/2017 | Daley | G06F 21/10 |
| 10,324,960 B1* | 6/2019 | Skvortsov | G06Q 30/0277 |
| 10,643,251 B1* | 5/2020 | Hanson | G06Q 30/0276 |
| 2001/0054002 A1* | 12/2001 | Suzuki | G06Q 30/0267 705/14.64 |
| 2002/0128908 A1* | 9/2002 | Levin | G06Q 30/02 705/14.53 |
| 2003/0004810 A1* | 1/2003 | Eldering | G06Q 20/20 705/14.52 |
| 2004/0163101 A1* | 8/2004 | Swix | G06Q 30/02 725/9 |
| 2005/0010477 A1* | 1/2005 | Sullivan | G06Q 30/02 705/14.13 |
| 2005/0144554 A1* | 6/2005 | Salmon | G06F 16/3323 715/277 |
| 2005/0216525 A1* | 9/2005 | Wachholz-Prill | G06Q 30/02 |
| 2006/0282328 A1* | 12/2006 | Gerace | G06F 16/9535 705/14.66 |
| 2007/0027757 A1* | 2/2007 | Collins | G06Q 30/0247 705/14.49 |
| 2007/0067297 A1* | 3/2007 | Kublickis | G06Q 20/29 |
| 2007/0094083 A1* | 4/2007 | Yruski | G06Q 30/02 705/14.66 |
| 2007/0162459 A1* | 7/2007 | Desai | G06Q 10/10 |
| 2007/0162566 A1* | 7/2007 | Desai | G06F 16/958 709/219 |
| 2007/0250467 A1* | 10/2007 | Mesnik | G06F 16/958 |
| 2008/0104026 A1* | 5/2008 | Koran | G06Q 10/087 |
| 2008/0147645 A1* | 6/2008 | O'Malley | G06F 16/285 |
| 2008/0215424 A1* | 9/2008 | Guldimann | G06Q 30/02 705/14.54 |
| 2008/0307052 A1* | 12/2008 | Krishnan | G06Q 30/02 709/205 |
| 2009/0063284 A1* | 3/2009 | Turpin | G06Q 30/02 705/14.61 |
| 2009/0171780 A1* | 7/2009 | Aldrey | G06Q 30/02 705/14.69 |
| 2009/0182615 A1* | 7/2009 | Pai | G06Q 30/02 705/14.61 |
| 2009/0187939 A1* | 7/2009 | Lajoie | G06Q 30/02 725/34 |
| 2009/0248670 A1* | 10/2009 | Fiatal | G06F 16/435 |
| 2010/0318426 A1* | 12/2010 | Grant | G06Q 30/0241 705/14.66 |
| 2011/0225290 A1* | 9/2011 | Kansal | H04L 67/1097 709/224 |
| 2011/0302124 A1* | 12/2011 | Cai | G06F 16/353 706/52 |
| 2011/0320429 A1* | 12/2011 | Doig | G06F 16/972 707/711 |
| 2012/0095834 A1* | 4/2012 | Doig | G06F 16/9535 705/14.53 |
| 2012/0109711 A1* | 5/2012 | Boe | G06Q 30/02 705/7.31 |
| 2012/0143911 A1* | 6/2012 | Liebald | G06F 3/0482 707/771 |
| 2012/0150645 A1* | 6/2012 | Mandyam | G06Q 30/0256 705/14.54 |
| 2012/0179509 A1* | 7/2012 | Jeffrey | G06Q 10/10 705/7.29 |
| 2012/0191546 A1* | 7/2012 | Phelan | G06Q 10/107 705/14.67 |
| 2013/0055309 A1* | 2/2013 | Dittus | G06Q 30/0269 725/35 |
| 2013/0086179 A1* | 4/2013 | Coleman | H04W 4/12 709/206 |
| 2013/0104054 A1* | 4/2013 | Cao | G06F 3/038 715/753 |
| 2013/0195322 A1* | 8/2013 | Santhiveeran | G06Q 30/0251 382/118 |
| 2013/0260356 A1* | 10/2013 | Kutty | G09B 7/00 434/354 |
| 2015/0081723 A1* | 3/2015 | Ogawa | G06F 16/955 707/748 |
| 2015/0100406 A1* | 4/2015 | Klimetschek | G06Q 30/0242 705/14.41 |
| 2015/0310351 A1* | 10/2015 | Caplan | G06N 20/00 706/12 |
| 2015/0348078 A1* | 12/2015 | Alsina | G06Q 30/0214 705/14.16 |
| 2016/0044131 A1* | 2/2016 | Liebald | G06F 3/0482 709/231 |
| 2016/0071162 A1* | 3/2016 | Ogawa | G06Q 30/0269 705/14.66 |
| 2016/0098748 A1* | 4/2016 | Dittus | H04N 21/812 705/14.53 |
| 2016/0125469 A1* | 5/2016 | Tseng | G06F 16/24 705/14.58 |
| 2016/0173633 A1* | 6/2016 | Bax | H04L 67/42 709/219 |
| 2016/0234152 A1* | 8/2016 | Allen | G06F 16/951 |
| 2017/0076327 A1* | 3/2017 | Filippini | G06F 16/285 |
| 2018/0004846 A1* | 1/2018 | Zhou | G06F 16/9535 |
| 2018/0040035 A1* | 2/2018 | Qi | G06Q 30/0255 |
| 2018/0268073 A1* | 9/2018 | Wang | H04L 67/22 |
| 2019/0104201 A1* | 4/2019 | Bati | H04L 61/251 |
| 2019/0130436 A1* | 5/2019 | Ma | G06Q 30/0244 |
| 2020/0302333 A1* | 9/2020 | Yan | G06N 20/00 |
| 2021/0103953 A1* | 4/2021 | Iyer | G06Q 30/0255 |

OTHER PUBLICATIONS

"Oops! How to Deal with Email Mistakes" by ClickDimensions (see http://blog.clickdimensions.com/oops-how-to-deal-with-email-mistakes/; pub date: May 11, 2017; downloaded on Aug. 27, 2020) (hereinafter ClickDimensions). (Year: 2017).*

* cited by examiner

TRANSMITTING RESPONSE CONTENT ITEMS

BACKGROUND

Many services, such as websites, applications, etc. may provide platforms for viewing media. For example, a user may interact with a service. Media may be presented to the user while interacting with the service. The media may be produced by a first party and may comprise representations of a first perspective of an issue. The representations of the first perspective of the issue may comprise misleading, false and/or unproven information. The user may (e.g., only) be exposed to the representations of the first perspective of the issue. Thus, a second party associated with a second perspective of the issue may be at a disadvantage.

SUMMARY

In accordance with the present disclosure, one or more computing devices and/or methods are provided. In an example, a request to generate a report may be received via a device. The request may comprise a topic and a user type. A plurality of content items may be selected from a content items database based upon the topic. A plurality of users may be selected from a user database based upon the user type. A plurality of sets of assignments of content items corresponding to the plurality of users may be determined. Each set of assignments of the plurality of sets of assignments may correspond to a set of content items assigned to a user of the plurality of users. The plurality of users may be clustered into a plurality of groups of users based upon the plurality of sets of assignments. A plurality of group profiles may be generated. Each group profile of the plurality of group profiles may correspond to a group of users of the plurality of groups of users. At least a portion of each group of users of the plurality of groups are assigned to one or more content items of the plurality of content items. The report may be generated. The report may comprise one or more representations of the plurality of group profiles. A graphical user interface may be controlled to display a targeting interface comprising the report and one or more selectable inputs. Each selectable input of the one or more selectable inputs may correspond to a group profile from the plurality of group profiles. A second request for a targeted response to one or more content items of the plurality of content items may be received via the targeting interface. The second request may comprise a response content item and a first selection of a first input of the one or more selectable inputs. The first input may correspond to a first group profile of the plurality of group profiles. A list of users may be generated based upon the first group profile. The response content item may be transmitted to a plurality of devices. Each device of the plurality of devices may be associated with a user in the list of users.

In an example, a graphical user interface may be controlled to display a user profile interface. The user profile interface may comprise one or more selectable inputs associated with characteristics of a user profile. A request to generate a list of content items associated with the user profile may be received via the user profile interface. The request may comprise a topic and selections of characteristics of the user profile. Responsive to receiving the request, a plurality of content items may be selected from a content items database based upon the topic. A set of content items may be selected from amongst the plurality of content items, based upon the user profile. The list of content items may be generated based upon a combination of representations of the set of content items. A report may be generated comprising the list of content items. The report may be presented.

In an example, a graphical user interface may be controlled to display one or more content items in a content platform interface. The content platform interface may comprise a selectable input. The selectable input may correspond to a content item of the one or more content items. A request for a targeted response to the content item may be received via the content platform interface. The request may comprise a response content item and a selection of the selectable input. A plurality of assignments of the content item to a plurality of users may be determined. The response content item may be transmitted to a plurality of devices. Each device of the plurality of devices may be associated with a user of the plurality of users.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
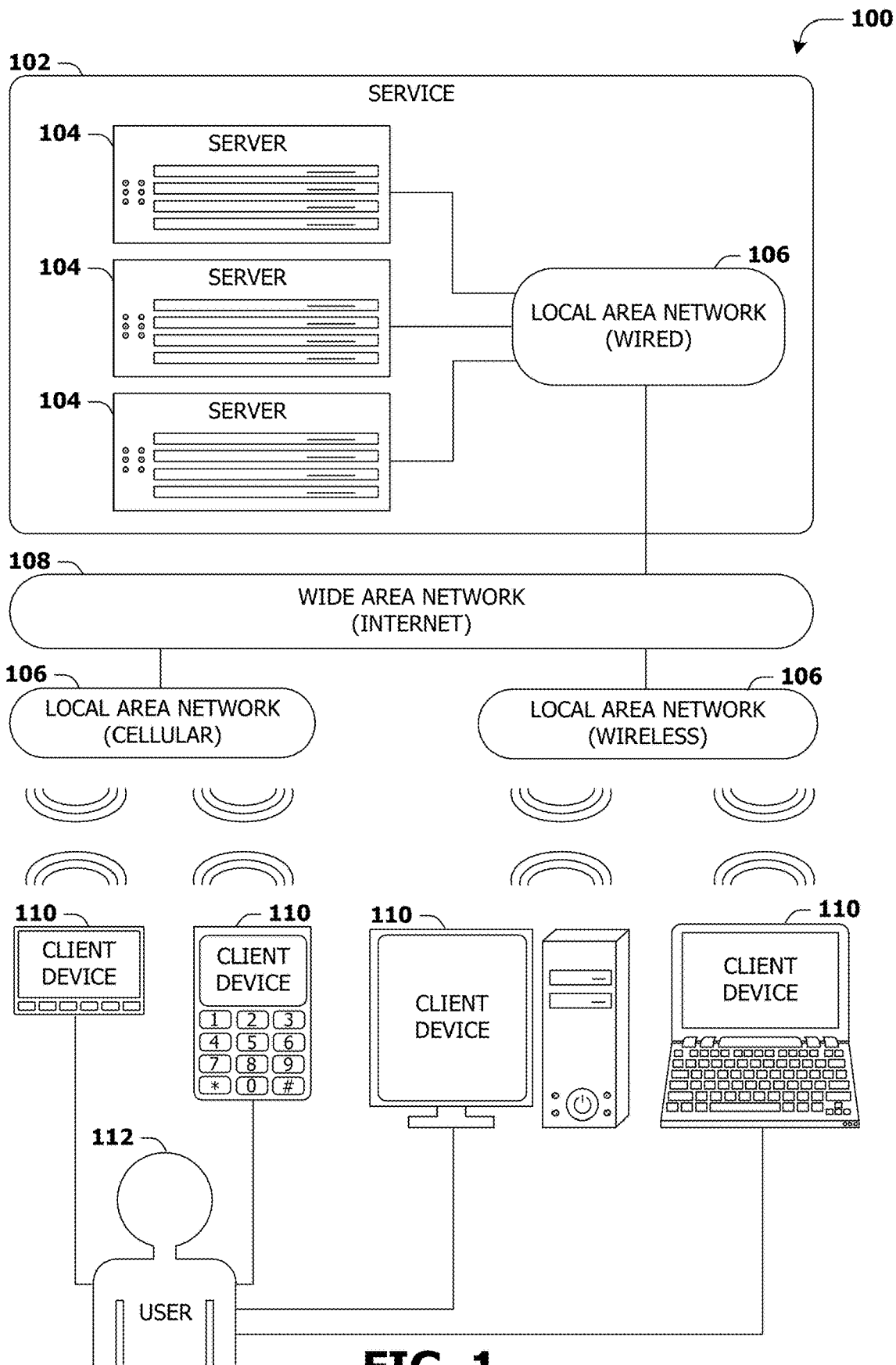
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
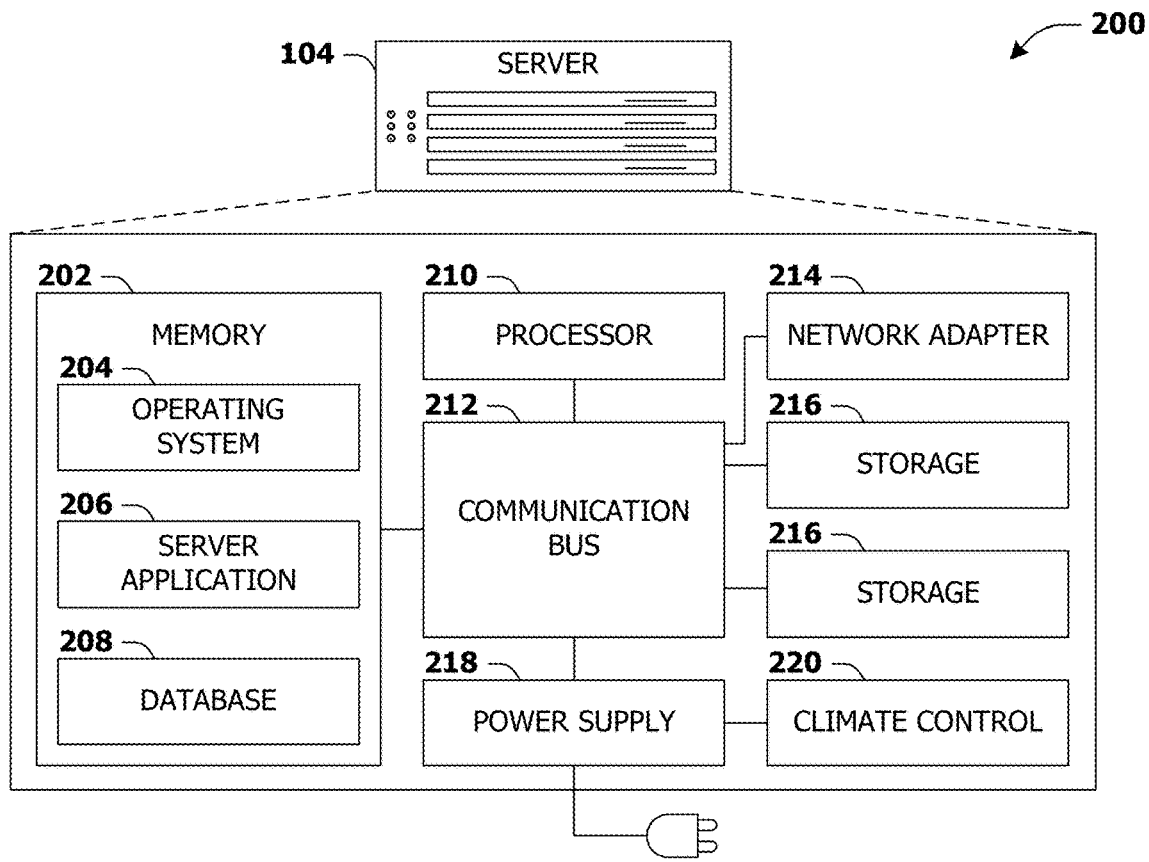
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
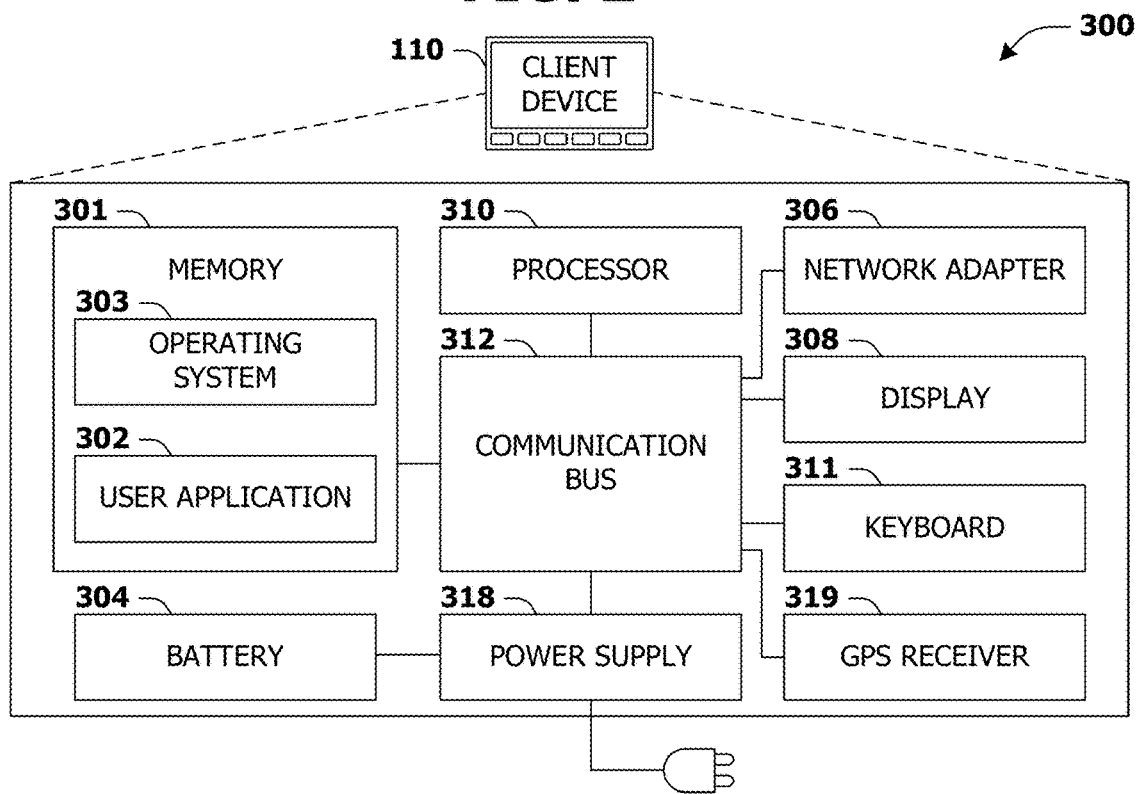
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for transmitting response content items to devices are presented. For example, a user may access and/or interact with a service, such as a website, an application, etc. that provides a platform for viewing and/or downloading content items from a server (e.g., of the website, the application, etc.). For example, a first content item may be assigned to (e.g., presented to and/or targeted to) the user. The first content item may be produced by a first party and/or may comprise representations of a first perspective of an issue. The first content item (e.g., and/or the representations of the first perspective of the issue) may comprise misleading, false and/or unproven information (e.g., about the issue). A second party associated with (e.g., and/or advocating) a second perspective of the issue may not be familiar with the first content item and/or may not be familiar with the user and/or a plurality of (e.g., other) users the first content item may be assigned to. Thus, the user may (e.g., only) be exposed to the first content item (e.g., comprising the representations of the first perspective of the issue). Thus, the second party may be at a disadvantage as a result of an inability to transmit (e.g., and/or present) a response content item, comprising representations of the second perspective of the issue, to the user and/or the plurality of users the first content item may be assigned to. Thus, in accordance with one or more of the techniques presented herein, a graphical user interface may enable the second party to identify the first content item and/or one or more (e.g., other) content items associated with (e.g., and/or advocating perspectives of) the first party and/or a (e.g., different) opposing party. The second party may (e.g., then) transmit the response content item and/or may (e.g., other) response content items (e.g., using the graphical user interface) to a plurality of users the first content item and/or one or more other content items may be assigned to.

Figure 4A:
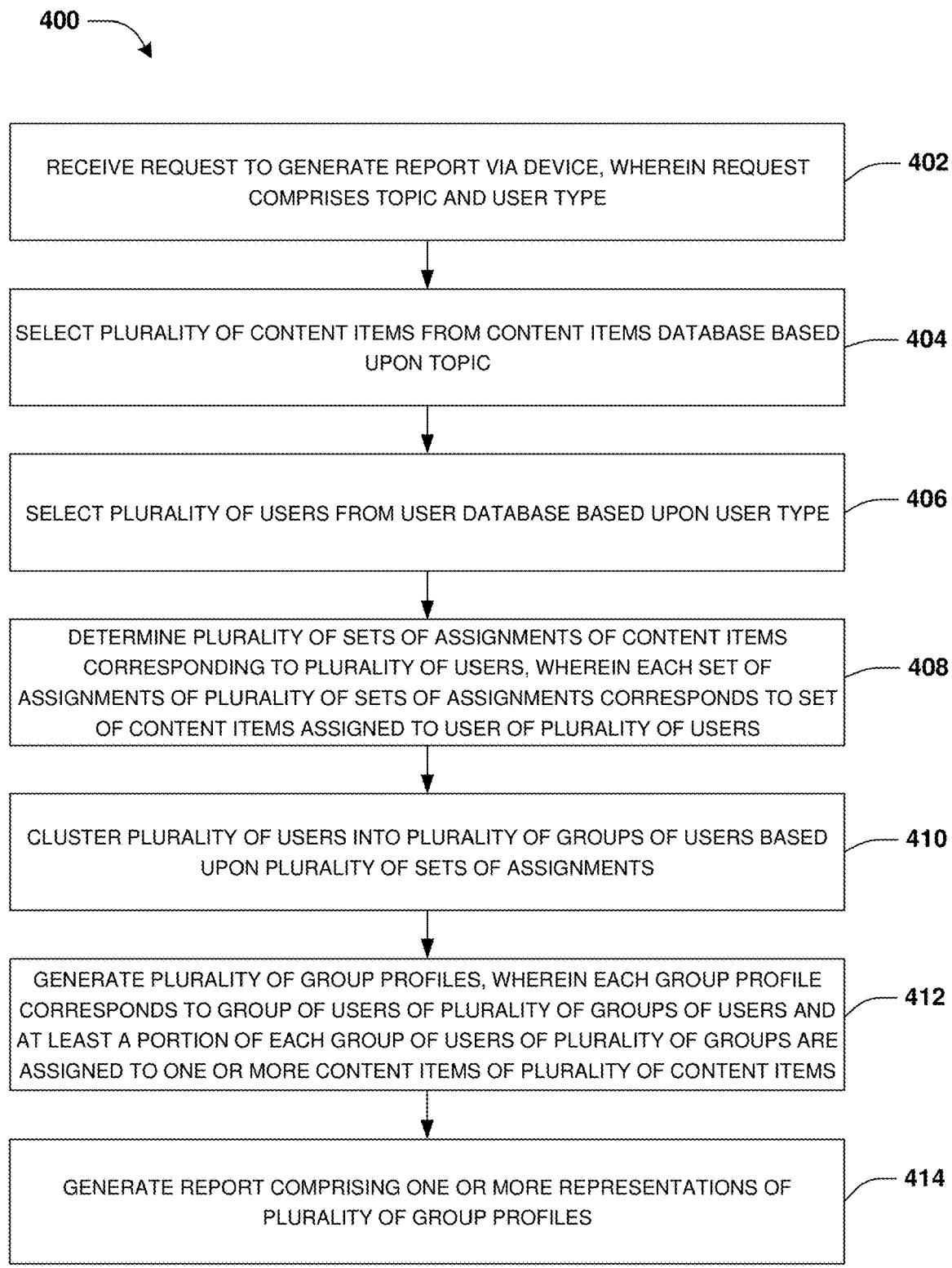
FIGS. 4A-4B are flow charts illustrating an example method for transmitting response content items to devices.
Figure 4B:
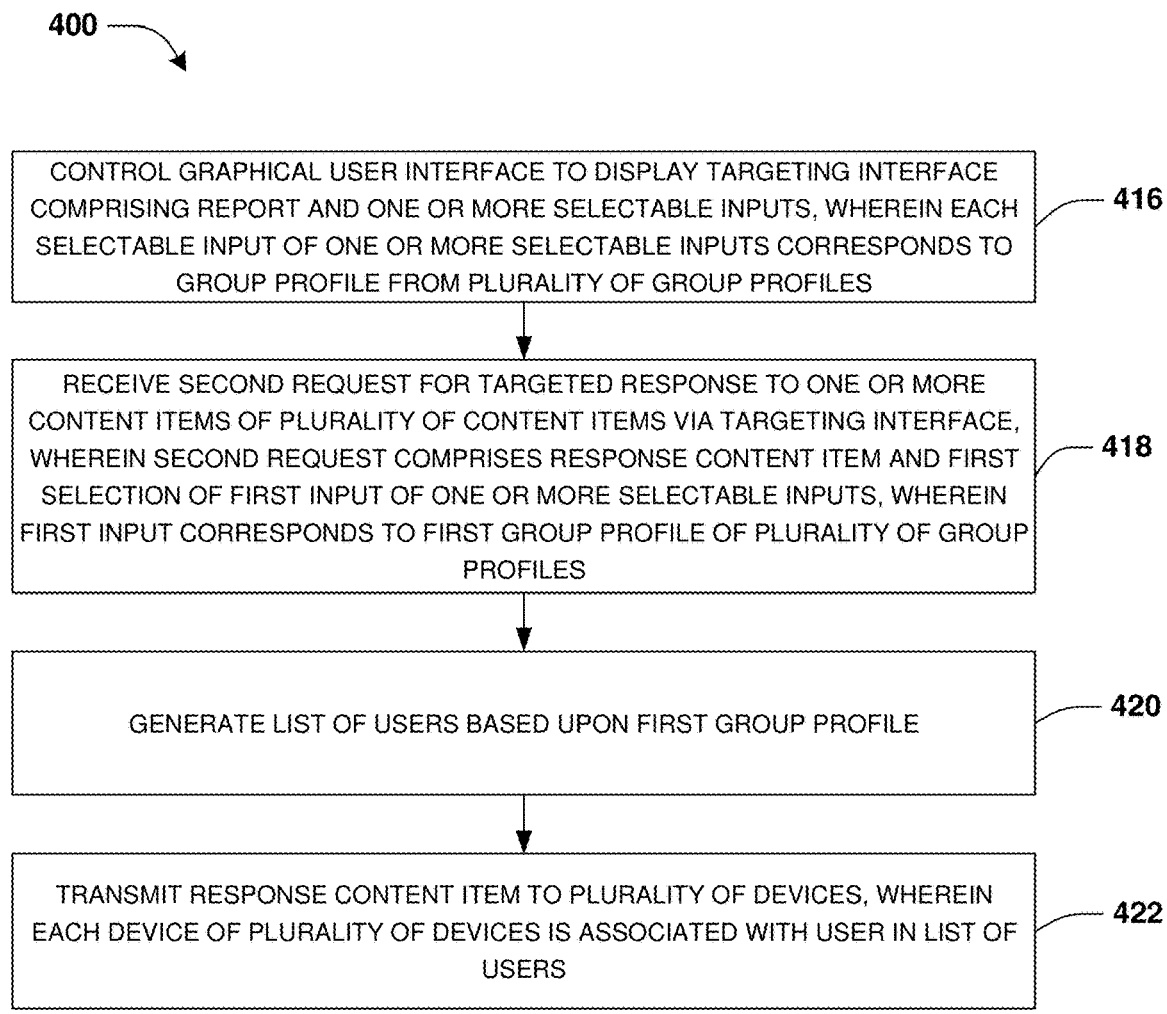

An embodiment of transmitting response content items to devices is illustrated by an example method 400 of FIGS. 4A-4B. A first user, such as user Jill, (e.g., and/or a first device associated with the first user) may access and/or interact with a service, such as a website, an application, etc. that provides a platform for viewing and/or downloading content items from one or more servers (e.g., of the website, the application, etc.) and/or from a content items database stored on the one or more servers. Alternatively and/or additionally, the service may (e.g., further) provide for accessing and/or interacting with a targeting interface to identify one or more content items and/or transmit one or more response content items to one or more devices.

At 402, a request to generate a report may be received via the first device (e.g., associated with the first user). The request may comprise a topic and/or a user type. For example, the first user (e.g., and/or the first device) may transmit the request to one or more servers (e.g., associated with the service) via a network connection. In an example, a graphical user interface of the first device may be controlled to display the targeting interface comprising a first selectable input corresponding to the topic and/or a second selectable input corresponding to the user type. Responsive to a selection of the first selectable input, a list of topics may be presented (e.g., via the targeting interface). The topic may be selected from the list of topics. In some examples, the list of topics may comprise "All Topics", "Political Campaigns", "Environmental Awareness", etc. Responsive to a selection of the second selectable input, a plurality of selectable inputs may be presented (e.g., via the targeting interface) corresponding to demographic parameters, behavior and/or settings associated with the user type. For example, an age-range, one or more locations, etc. corresponding to the user type may be selected. In some examples, a selectable input of the plurality of selectable inputs may correspond to all user types.

At 404, a plurality of content items may be selected from the content items database based upon the topic. For example, the content items database may be stored on one or more servers (e.g., associated with the service) (e.g., accessed by the first device via a network connection). In some examples, each content item in the content items database may be linked with an identifier identifying one or more topics. The plurality of content items may be selected responsive to determining that identifiers of the plurality of content items are similar to the topic.

At 406, a plurality of users may be selected from a user database based upon the user type. In some examples, the user database may be stored on one or more servers (e.g., associated with the service) (e.g., accessed by the first device via a network connection). In some examples, each user in the database of users may be linked with an identifier identifying one or more user types and/or characteristics (e.g., demographic parameters, behavior and/or settings). The plurality of users may be selected responsive to determining that identifiers of the plurality of users are similar to the user type. Alternatively and/or additionally, a second plurality of users may be selected from the user database based upon the user type. The plurality of users may (e.g., then) be (e.g., randomly) sampled from the second plurality of users.

At 408, a plurality of sets of assignments of content items corresponding to the plurality of users may be determined. Each set of assignments of the plurality of sets of assignments may correspond to a set of content items assigned to a user of the plurality of users. For example, a first set of assignments of the plurality of sets of assignments may correspond to a first set of content items assigned to a second user of the plurality of users, a second set of assignments of the plurality of sets of assignments may correspond to a second set of content items assigned to a third user of the plurality of users, etc.

In some examples, the plurality of sets of assignments may be retrieved from (e.g., and/or determined by analyzing) a user history database. The user history database may be stored on one or more servers (e.g., associated with the service) (e.g., accessed by the first device via a network connection). Each assignment of the plurality of sets of assignments may correspond to a content item of the plurality of content items presented (e.g., for display, to be played, etc.) to a user of the plurality of users (e.g., and/or transmitted to a device associated with the user). For example, each user in the user history database may be linked with an identifier identifying one or more content items presented to the user (e.g., and/or transmitted to the device associated with the user).

Alternatively and/or additionally, the plurality of sets of assignments may be retrieved from (e.g., and/or determined by analyzing) a user targeting database. The user targeting database may be stored on one or more servers (e.g., associated with the service) (e.g., accessed by the first device via a network connection). Each assignment of the plurality of sets of assignments may correspond to a content item of the plurality of content items targeted (e.g., but not necessarily displayed and/or played) to a user of the plurality of users. For example, each user in the user targeting database may be linked with an identifier identifying one or more content items targeted to the user. The one or more content items may (e.g., previously) have been presented (e.g., for display, to be played, etc.) to the user and/or the one or more content items may be targeted to (e.g., and/or assigned to) the user such that the one or more content items may (e.g., later and/or in accordance with a schedule) be transmitted to a device of the user and/or may be presented to the user (e.g., automatically) (e.g., while the user interacts with the service and/or a different service).

At 410, the plurality of users may be clustered into a plurality of groups of users based upon the plurality of sets of assignments. Alternatively and/or additionally, the plurality of users may be clustered into the plurality of groups of users based upon user information (e.g., demographic parameters, behavior, settings, etc.) corresponding to (e.g., each user of) the plurality of users. In some examples, a plurality of weights corresponding to the plurality of content items may be determined (e.g., by using a term frequency-inverse document frequency (TF-IDF) method) based upon frequencies of assignments of each content item of the plurality of content items. For example, a first content item of the plurality of content items may be assigned to a first number of users of the plurality of users. A second content item of the plurality of content items may be assigned to a second number of users of the plurality of users. The first number of users (e.g., corresponding to assignments of the first content item) may be greater than the second number of users (e.g., corresponding to assignments of the second content item). Thus, a first weight corresponding to the first content item may be greater than (e.g., or less than) a second weight corresponding to the second content item.

Alternatively and/or additionally, the plurality of weights corresponding to the plurality of content items may be determined based upon frequencies of presentations of each content item of the plurality of content items. For example, the first content item may be presented to one or more first users a first number of presentations. The second content item may be presented to one or more second users a second number of presentations. The first number of presentations (e.g., corresponding to the first content item) may be greater than the second number of presentations (e.g., corresponding to the second content item). Thus, the first weight corresponding to the first content item may be greater than (e.g., or less than) a second weight corresponding to the second content item. In some examples, the plurality of users may be clustered into the plurality of groups of users based upon the plurality of weights.

In some examples, the plurality of users may be clustered into the plurality of groups of users by performing principal component analysis (PCA), k-means clustering, bag-of-words modeling, cosine similarity measurements, implementation of a binary search tree (e.g., such as k-dimensional tree (k-d tree)) and/or one or more (e.g., other) clustering techniques. For example, by performing bag-of-words modeling, a plurality of vectors may be generated based upon the plurality of users. Each vector of the plurality of vectors may correspond to a user of the plurality of users. The plurality of vectors may (e.g., each) comprise a plurality of dimensions corresponding to the plurality of content items. For example, each dimension of the plurality of dimensions (e.g., of each vector of the plurality of vectors) may correspond to a content item of the plurality of content items. In some examples, dimensions of a vector corresponding to content items not assigned to a user (e.g., associated with the vector) may be set to 0. Alternatively and/or additionally, dimensions of the vector corresponding to content items assigned to the user (e.g., associated with the vector) may be set to 1. The plurality of vectors may be compared (e.g., to each other) to cluster the plurality of users into the plurality of groups of users.

At 412, a plurality of group profiles may be generated (e.g., based upon the plurality of groups of users). Each group profile of the plurality of group profiles may correspond to a group of users of the plurality of groups of users. At least a portion of each group of users of the plurality of groups of users may be assigned to one or more content items of the plurality of content items. In some examples, information comprising demographic parameters, behavior and/or settings associated with the plurality of users and/or a plurality of devices (e.g., associated with the plurality of users) may be retrieved from the user history database and/or the user database (e.g., and/or a device settings database). The demographic parameters may comprise locations, ages, genders, education levels, income levels, marital statuses, occupations, religions, family sizes, etc. of (e.g., each user of) the plurality of users. The behavior may comprise interests (e.g., past viewed content items, liked content items, comments, etc.) of (e.g., each user of) the plurality of users. The device settings may comprise (e.g., GPS) geographic locations determined to be associated with a device, an operating system of the device, software implemented on the device, etc.

In some examples, each group profile of the plurality of group profiles may comprise a combination of a portion of the information (e.g., comprising the demographic parameters, the behavior and/or the settings), wherein the portion of the information corresponds to a group of users (e.g., of the plurality of groups of users) corresponding to the group profile. In an example, a first set of information, of the information, corresponding to a first group of users, may be combined to generate a first group profile corresponding to the first group of users. Alternatively and/or additionally, a second set of information, of the information, corresponding to a second group of users, may be combined to generate a second group profile corresponding to the second group of users. Accordingly, the first group profile may comprise first aggregate information comprising a combination of the first set of information (e.g., corresponding to the first group of users) and/or the second group profile may comprise second aggregate information comprising a combination of the second set of information (e.g., corresponding to the second group of users).

In some examples, each group profile of the plurality of group profiles may (e.g., further) comprise characteristics associated with one or more content items, wherein at least a portion of a group of users corresponding to the group profile may be assigned to the one or more content items. In an example, a third content item of the plurality of content items may be assigned to at least a portion of the first group of users. A first number of users, of the first group of users, assigned to the third content item may be determined. A first proportion of the first number of users relative to a first total number of users of the first group of users may be generated. A second number of users, of the plurality of users, assigned to the third content item may be determined. A second proportion of the second number of users relative to a second total number of users of the plurality of users may be generated. An (e.g., mathematical) operation may be performed on the first proportion and/or the second proportion to determine a combination of the first proportion and/or the second proportion. For example, a difference of the first proportion and the second proportion may be determined to determine the combination. Accordingly, the first group profile (e.g., corresponding to the first group of users) may comprise first characteristics comprising the first number of users, the first proportion, the second number of users, the second proportion and/or the combination.

Alternatively and/or additionally, the plurality of content items may be clustered into a plurality of groups of content items (e.g., rather than clustering the plurality of users into the plurality of groups of users and/or in addition to clustering the plurality of users into the plurality of groups of users). In some examples, the plurality of content items may be clustered into the plurality of content items based upon the plurality of sets of assignments. Alternatively and/or additionally, the plurality of content items may be clustered into the plurality of content items based upon content item information (e.g., properties, subject matter, etc.) of (e.g., each content item of) the plurality of content items.

In some examples, the plurality of content items may be clustered into the plurality of groups of users by performing PCA, k-means clustering, bag-of-words modeling, cosine similarity measurements, implementation of a binary search tree (e.g., such as k-d tree) and/or one or more (e.g., other) clustering techniques. For example, by performing bag-of-words modeling, a plurality of vectors may be generated based upon the plurality of content items. Each vector of the plurality of vectors may correspond to a content item of the plurality of content items. The plurality of vectors may (e.g., each) comprise a plurality of dimensions corresponding to the plurality of users. For example, each dimension of the plurality of dimensions (e.g., of each vector of the plurality of vectors) may correspond to a user of the plurality of users. In some examples, dimensions of a vector corresponding to users (e.g., that) a content item (e.g., associated with the vector) is not assigned to may be set to 0. Alternatively and/or additionally, dimensions of the vector corresponding to users (e.g., that) a content item (e.g., associated with the vector) is assigned to may be set to 1. The plurality of vectors may be compared (e.g., to each other) to cluster the plurality of content items into the plurality of groups of content items.

A second plurality of group profiles may be generated (e.g., based upon the plurality of groups of content items). Each group profile of the second plurality of group profiles may correspond to a group of content items of the plurality of groups of content items. Each group profile of the second plurality of group profiles may comprise (e.g., aggregated) demographic parameters, behavior and/or settings associated with users associated with the group profile of the second plurality of group profiles. Alternatively and/or additionally, each group profile of the second plurality of group profiles may comprise (e.g., aggregated) content item information (e.g., properties, subject-matter, etc.) associated with content items (e.g., associated with each group profile of the second plurality of group profiles). Alternatively and/or additionally, each group profile of the second plurality of group profiles may comprise characteristics associated with content items (e.g., associated with each group profile of the second plurality of group profiles). Accordingly, the plurality of group profiles may be generated based upon the second plurality of group profiles and/or the plurality of groups of content items.

At 414, a report comprising one or more representations of the plurality of group profiles may be generated. The report may comprise a plurality of graphical objects. Each graphical object of the plurality of graphical objects may comprise one or more representations of a group profile of the plurality of group profiles. For example, the plurality of graphical objects may comprise a plurality of maps, wherein each map of the plurality of maps may comprise one or more representations of a group profile of the plurality of group profiles. In an example, a first graphical object of the plurality of graphical objects, corresponding to the first group profile, may comprise one or more representations of the first aggregate information (e.g., corresponding to the first group of users) and/or the first characteristics. For example, the first graphical object may comprise a first map (e.g., of the plurality of maps) illustrating one or more locations associated with the first aggregate information. The report may (e.g., further) comprise a plurality of summaries. Each summary of the plurality of summaries may comprise one or more representations of a group profile of the plurality of group profiles.

At 416, the graphical user interface (e.g., of the first device) may be controlled to display the targeting interface comprising the report and one or more selectable inputs. Each selectable input of the one or more selectable inputs may correspond to a group profile of the plurality of group profiles. In some examples, the targeting interface may provide for browsing, viewing and/or searching for group profiles of the plurality of group profiles and/or content items of the plurality of content items. For example, the targeting interface may provide for browsing (e.g., through) the report (e.g., the plurality of graphical objects, the plurality of summaries, etc.) corresponding to the plurality of group profiles, viewing content items corresponding to group profiles of the plurality of group profiles, etc. Each selectable input of the one or more selectable inputs may correspond to (e.g., a request for) a targeted response to one or more content items (e.g., corresponding to a group profile of the plurality of profiles).

At 418, a second request for a targeted response to one or more content items of the plurality of content items may be received via the targeting interface. The second request may comprise a response content item and a first selection of a first input of the one or more selectable inputs. The first input may correspond to the first group profile of the plurality of group profiles. For example, the first input may be selected (e.g., via the targeting interface) by the first user (e.g., and/or the first device). In some examples, responsive to (e.g., receiving) the first selection of the first input, the targeting interface may provide for uploading of the response content item to one or more servers (e.g., of the service) (e.g., from the first device).

In some examples, at least a portion (e.g., some users, most users, all users, etc.) of the first group of users (e.g., corresponding to the first group profile) may be assigned to a fourth content item. The fourth content item may be produced by a first party and/or may comprise representations of a first perspective of an issue. The fourth content item (e.g., and/or the representations of the first perspective of the issue) may comprise misleading, false and/or unproven information (e.g., about the issue). The first user may be associated with (e.g., and/or advocate) a second perspective of the issue. The first user may identify the fourth content item using the targeting interface (e.g., by browsing through the report, viewing content items of the plurality of content items, etc.). The response content item may comprise representations of the second perspective of the issue. The response content item may (e.g., further) comprise corrections and/or responses to the fourth content item (e.g., and/or responses to the misleading, false and/or unproven information of the fourth content item).

At 420, a list of users may be generated based upon the first group profile. For example, the user database and/or the user history database may be evaluated based upon the first group profile. Users of the user database and/or the user history database may be compared to the first group profile to generate the list of users. For example, the list of users may comprise a third plurality of users. Each user of the third plurality of users may have a similarity to the first group profile exceeding a threshold.

At 422, the response content item may be transmitted to a second plurality of devices. Each device of the second plurality of devices may be associated with a user in the list of users. For example, the response content item may be assigned to the third plurality of users (e.g., of the list of users). A fourth user, of the third plurality of users, may (e.g., later) access and/or interact with the service (e.g., and/or a different service). Responsive to the fourth user accessing and/or interacting with the service (e.g., and/or the different service), the response content item may be transmitted to a second device (e.g., associated with the fourth user) and/or may be presented to the fourth user (e.g., automatically) (e.g., while the fourth user interacts with the service and/or the different service). In some examples, the transmission of the response content item may be controlled such that the response content item is transmitted only to the second plurality of devices associated with a user in the list of users and/or is not be transmitted to one or more (e.g., any) devices that are not associated with a user in the list of users.

Figure 4C:
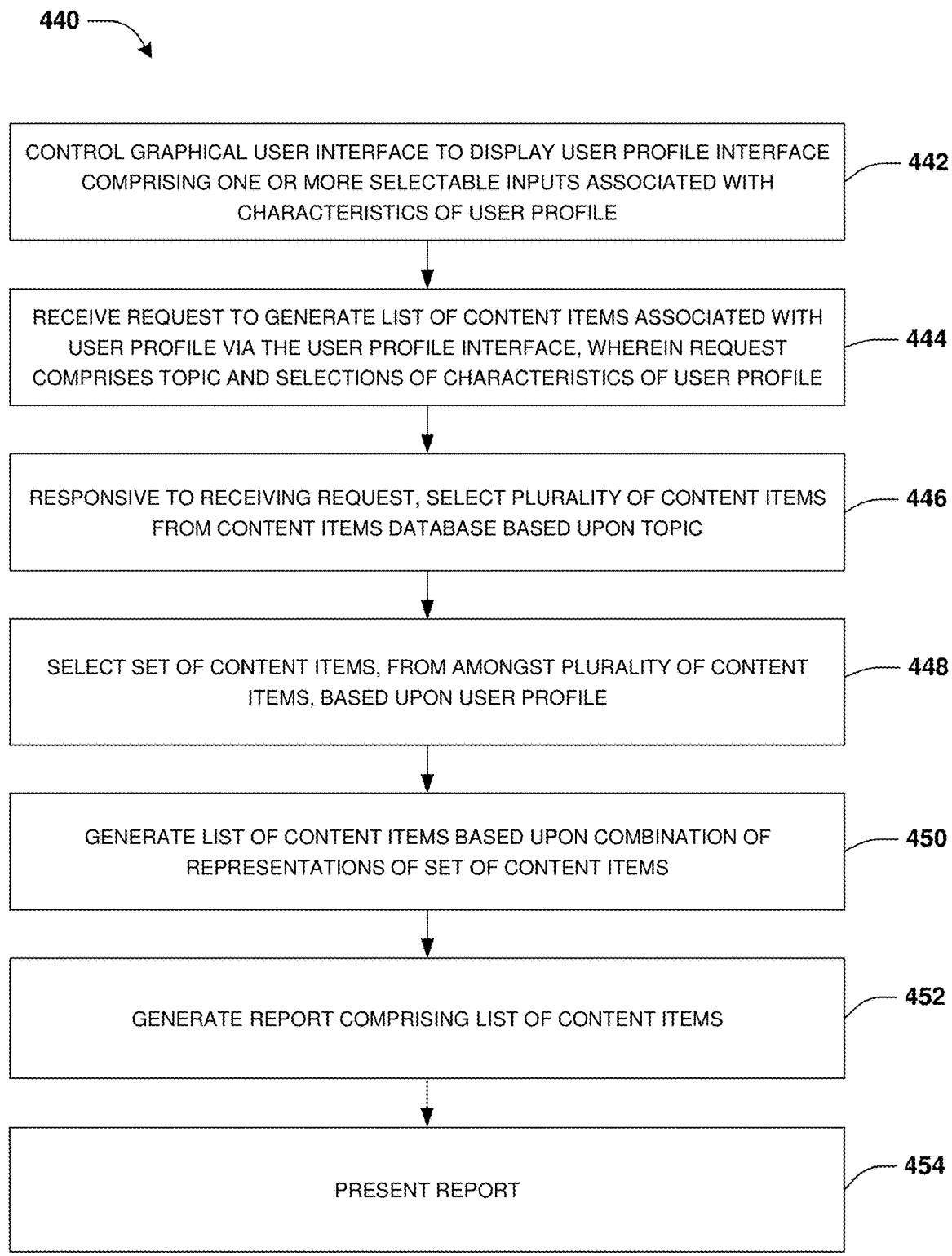
FIG. 4C is a flow chart illustrating an example method for generating a list of content items based upon a user profile.

An embodiment of generating a list of content items based upon a user profile is illustrated by an example method 440 of FIG. 4C. A first user, such as user James, (e.g., and/or a first device associated with the first user) may access and/or interact with a service, such as a website, an application, etc. that provides a platform for accessing and/or interacting with a user profile interface.

Accordingly, at 442, a graphical user interface (e.g., of the first device) may be controlled to display the user profile interface. The user profile interface may provide for viewing and/or selecting characteristics of a user profile. The user profile interface may comprise one or more selectable inputs associated with characteristics of the user profile. For example, the characteristics may comprise demographic parameters, behavior and/or settings associated with the user profile. The demographic parameters may comprise locations, ages, genders, education levels, income levels, marital statuses, occupations, religions, family sizes, etc. associated with the user profile. The behavior may comprise interests (e.g., past viewed content items, liked content items, comments, etc.) associated with the user profile. Accordingly, the characteristics (e.g., the demographic parameters, the behavior and/or the settings) associated with the user profile may be selected (e.g., by the first user) using the one or more selectable inputs.

The user profile interface may (e.g., further) comprise a second selectable input corresponding to a topic. Responsive to a selection of the second selectable input, a list of topics may be presented (e.g., via the user profile interface). The topic may be selected from the list of topics. In some examples, the list of topics may comprise "All Topics", "Political Campaigns", "Environmental Awareness", etc. The user profile interface may (e.g., further) comprise a third selectable input corresponding to a request to generate a list of content items associated with the user profile. At 444, the request to generate the list of content items associated with the user profile may be received via the user profile interface (e.g., by receiving a selection of the third selectable input). The request may comprise the topic and selections of characteristics of the user profile.

At 446, responsive to receiving the request, a plurality of content items may be selected from a content items database based upon the topic. For example, the content items database may be stored on one or more servers (e.g., associated with the service) (e.g., accessed by the first device via a network connection). In some examples, each content item in the content items database may be linked with an identifier identifying one or more topics. The plurality of content items may be selected responsive to determining that identifiers of the plurality of content items are similar to the topic.

At 448, a set of content items may be selected from amongst the plurality of content items. The set of content items may be selected based upon the user profile. For example, each content item of the plurality of content items may be linked with an identifier identifying one or more characteristics of users the content item is assigned to. The set of content items may be selected responsive to determining that identifiers of the set of content items are similar to the user profile.

Alternatively and/or additionally, a plurality of users may be selected from a user database. In some examples, the user database may be stored on one or more servers (e.g., associated with the service) (e.g., accessed by the first device via a network connection). In some examples, each user of the plurality of users may be linked with an identifier identifying one or more user types and/or characteristics (e.g., demographic parameters, behavior and/or settings). The plurality of users may be selected responsive to determining that identifiers of the plurality of users are similar to the user profile. Alternatively and/or additionally, the plurality of users may be (e.g., randomly) sampled from the user database.

A plurality of sets of assignments of the plurality of content items corresponding to the plurality of users may be determined. Each set of assignments of the plurality of sets of assignments may correspond to a group of users (e.g., of the plurality of users) a content item of the plurality of content items is assigned to. Accordingly, a plurality of groups of users may be determined based upon the plurality of sets of assignments. Each group of users of the plurality of groups of users may correspond to users of the plurality of users (e.g., that) a content item of the plurality of content items is assigned to. For example, a first content item of the plurality of content items may be assigned to a first group of users of the plurality of groups of users, a second content item of the plurality of content items may be assigned to a second group of users of the plurality of groups of users, etc.

In some examples, the plurality of sets of assignments may be retrieved from (e.g., and/or determined by analyzing) a user history database. The user history database may be stored on one or more servers (e.g., associated with the service) (e.g., accessed by the first device via a network connection). Each assignment of the plurality of sets of assignments may correspond to a content item of the plurality of content items presented to a user of the plurality of users (e.g., and/or transmitted to a device associated with the user). For example, each user in the user history database may be linked with an identifier identifying one or more content items presented to the user (e.g., and/or transmitted to the device associated with the user).

Alternatively and/or additionally, the plurality of sets of assignments may be retrieved from (e.g., and/or determined by analyzing) a user targeting database. The user targeting database may be stored on one or more servers (e.g., associated with the service) (e.g., accessed by the first device via a network connection). Each assignment of the plurality of sets of assignments may correspond to a content item of the plurality of content items targeted to a user of the plurality of users. For example, each user in the user targeting database may be linked with an identifier identifying one or more content items targeted to the user. The one or more content items may previously have been presented to the user and/or the one or more content items may be targeted to (e.g., and/or assigned to) the user such that the one or more content items may (e.g., later) be transmitted to a device of the user and/or may be presented to the user (e.g., automatically) (e.g., while the user interacts with the service and/or a different service).

A plurality of group profiles may be generated (e.g., based upon the plurality of groups of users). Each group profile of the plurality of group profiles may correspond to a group of users of the plurality of groups of users (e.g., that) a content item of the plurality of content items is assigned to. In some examples, information comprising demographic parameters, behavior and/or settings associated with the plurality of users or a plurality of devices (e.g., associated with the plurality of users) may be retrieved from the user history database and/or the user database (e.g., and/or a device settings database).

In some examples, each group profile of the plurality of group profiles may comprise a combination of a portion of the information (e.g., comprising the demographic parameters, the behavior and/or the settings), wherein the portion of the information corresponds to a group of users (e.g., of the plurality of groups of users) corresponding to the group profile. In an example, a first set of information, of the information, corresponding to a first group of users, may be combined to generate a first group profile corresponding to the first group of users. Alternatively and/or additionally, a second set of information, of the information, corresponding to a second group of users, may be combined to generate a second group profile corresponding to the second group of users. Accordingly, the first group profile may comprise first aggregate information comprising a combination of the first set of information (e.g., corresponding to the first group of users) and/or the second group profile may comprise second aggregate information comprising a combination of the second set of information (e.g., corresponding to the second group of users).

The user profile may be compared to (e.g., each group profile of) the plurality of group profiles. Accordingly, the set of content items may be selected responsive to determining that group profiles of a set of group profiles (e.g., of the plurality of group profiles) corresponding to the set of content items are similar to the user profile.

At 450, the list of content items may be generated based upon a combination of representations of the set of content items. For example, the list of content items may comprise a representation of each content item of the set of content items. In some examples, the list of content items may be ordered (e.g., arranged, organized, etc.) based upon similarities of identifiers (e.g., corresponding to the set of content items) to the user profile. Alternatively and/or additionally, the list of content items may be ordered based upon similarities of group profiles (e.g., of the set of group profiles corresponding to the set of content items) to the user profile.

At 452, a report comprising the list of content items may be generated. The report may (e.g., further) comprise a plurality of links. Each link of the plurality of links may correspond to a content item of the list of content items. Alternatively and/or additionally, the report may comprise a plurality of graphical objects. Each graphical object of the plurality of graphical objects may comprise one or more representations of a group profile of the set of group profiles corresponding to the set of content items. For example, the plurality of graphical objects may comprise a plurality of maps, wherein each map of the plurality of maps may comprise one or more representations of a group profile of the set of group profiles. In an example, a first graphical object of the plurality of graphical objects, corresponding to the first group profile, may comprise one or more representations of the first aggregate information (e.g., corresponding to the first group of users) and/or the first characteristics. For example, the first graphical object may comprise a first map (e.g., of the plurality of maps) illustrating one or more locations associated with the first aggregate information. The report may (e.g., further) comprise a plurality of summaries. Each summary of the plurality of summaries may comprise one or more representations of a group profile of the set of group profiles and/or one or more representations of a content item of the set of content items.

In some examples, the report (e.g., the plurality of graphical objects and/or the plurality of summaries) may not comprise at least a portion of the one or more representations of the plurality of group profiles and/or at least the portion of the one or more representations of the plurality of group profiles may not be presented to the user. For example, the one or more representations of the plurality of group profiles may comprise sensitive user information that may compromise a privacy of one or more users of the plurality of users.

It may be appreciated that user information comprised within the report and/or presented to the user may be configured (e.g., and/or adjusted, filtered, etc.) based upon privacy rules of users of the plurality of users.

A 454, the report may be presented. For example, the graphical user interface (e.g., of the first device) may be controlled to display a targeting interface comprising the report and one or more second selectable inputs. Each selectable input of the one or more second selectable inputs may correspond to a content item from the set of content items. In some examples, the targeting interface may provide for browsing, viewing and/or searching for content items of the set of content items and/or group profiles of the set of group profiles. For example, the targeting interface may provide for browsing (e.g., through) the report (e.g., the list of content items, the plurality of graphical objects, the plurality of summaries, etc.), viewing and/or downloading content items of the set of content items, etc. Each selectable input of the one or more second selectable inputs may correspond to (e.g., a request for) a targeted response to a content item of the set of content items.

A second request for a targeted response to the first content item of the set of content items may be received via the targeting interface. The second request may comprise a response content item and a first selection of a first input of the one or more selectable inputs. The first input may correspond to the first content item of the set of content items. For example, the first input may be selected (e.g., via the targeting interface) by the first user (e.g., and/or the first device). In some examples, responsive to (e.g., receiving) the first selection of the first input, the targeting interface may provide for uploading of the response content item to one or more servers (e.g., of the service) (e.g., from the first device).

A list of users may be generated based upon the user profile. For example, the user database and/or the user history database may be evaluated based upon the user profile. Users of the user database and/or the user history database may be compared to the user profile to generate the list of users. For example, the list of users may comprise a second plurality of users. Each user of the second plurality of users may have a similarity to the user profile exceeding a threshold.

Alternatively and/or additionally, the list of users may be generated based upon the first group profile (e.g., of the set of group profiles) associated with the first content item. For example, the user database and/or the user history database may be evaluated based upon the first group profile. Users of the user database and/or the user history database may be compared to the first group profile to generate the list of users. For example, each user of the second plurality of users (e.g., of the list of users) may have a similarity to the first group profile exceeding a threshold.

The response content item may be transmitted to a second plurality of devices. Each device of the second plurality of devices may be associated with a user in the list of users. For example, the response content item may be assigned to the second plurality of users (e.g., of the list of users). A second user, of the second plurality of users, may (e.g., later) access and/or interact with the service (e.g., and/or a different service such as a website, an application, etc.). Responsive to the second user accessing and/or interacting with the service (e.g., and/or the different service), the response content item may be transmitted to a second device (e.g., associated with the second user) and/or may be presented to the second user (e.g., automatically) (e.g., while the second user interacts with the service and/or the different service).

Figure 4D:
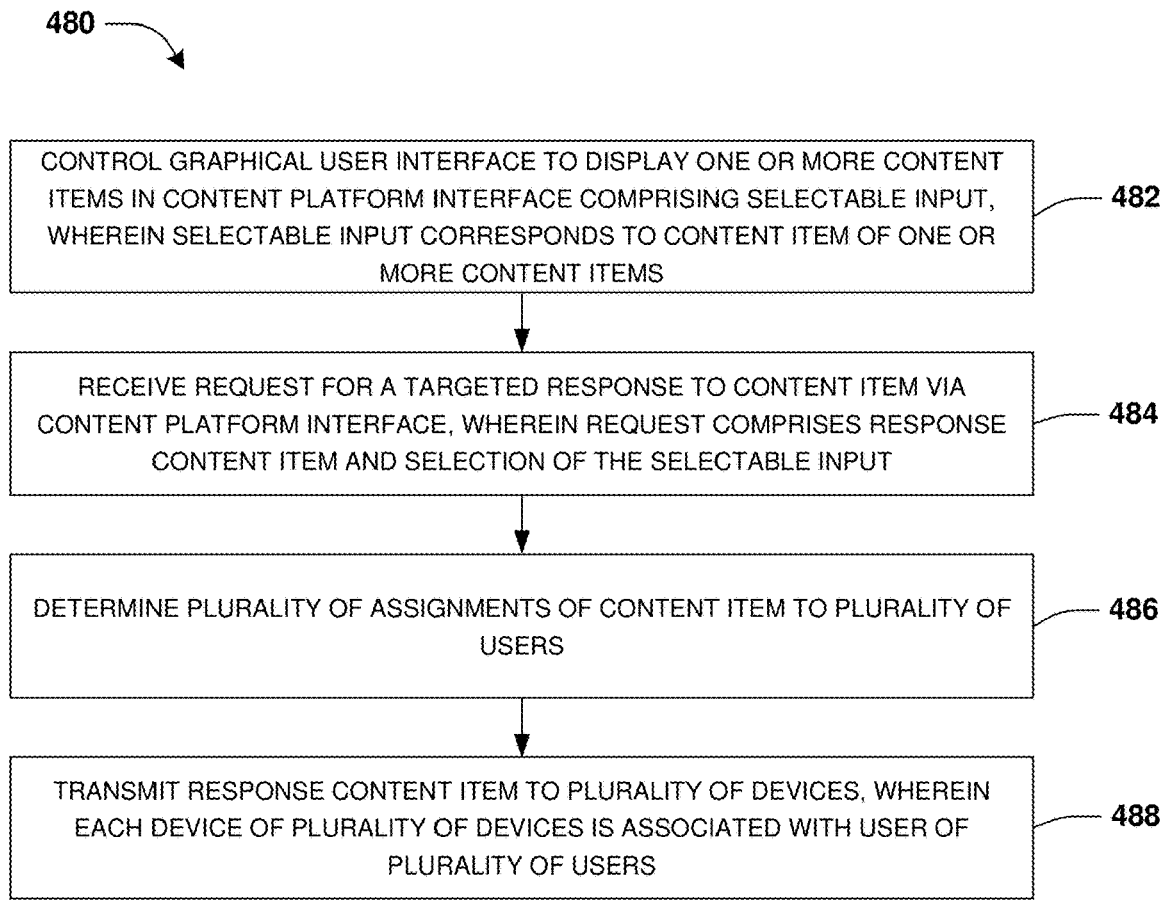
FIG. 4D is a flow chart illustrating an example method for transmitting response content items to devices.

An embodiment of transmitting response content items to devices is illustrated by an example method 480 of FIG. 4D. A first user, such as user Janet, (e.g., and/or a first device associated with the first user) may access and/or interact with a service, such as a website, an application, etc. that provides a content platform interface for viewing and/or downloading content items from one or more servers (e.g., of the website, the application, etc.) and/or from a content items database stored on the one or more servers. Alternatively and/or additionally, the service may (e.g., further) provide for identifying one or more content items and/or transmitting one or more response content items to one or more devices.

At 482, a graphical user interface (e.g., of the first device) may be controlled to display one or more content items in the content platform interface. The content platform interface may comprise a selectable input corresponding to a content item of the one or more content items. For example, the content item may be presented to the first user (e.g., via the content platform interface). The selectable input may be adjacent to (e.g., above, below, beside, etc.) the content item, may be accessed via a menu (e.g., upon right-clicking, double tapping, swiping, etc. the content item), or may be accessed using a response application (e.g., running separately from, as a plugin to, or as a host for, a browser running the content platform interface). The selectable input may correspond to (e.g., a request for) a targeted response to the content item.

At 484, a request for the targeted response to the content item may be received via the content platform interface. The request may comprise a response content item and a selection of the selectable input. For example, the selectable input may be selected (e.g., via the content platform interface) by the first user (e.g., and/or the first device). In some examples, responsive to (e.g., receiving) the selection of the selectable input, the content platform interface may provide for uploading of the response content item to one or more servers (e.g., of the service) (e.g., from the first device).

At 486, a plurality of assignments of the content item to a plurality of users may be determined. Each assignment of the plurality of assignments may correspond to a user of the plurality of users (e.g., that) the content item is assigned to. Accordingly, each user of the plurality of users may be assigned to the content item. In some examples, the plurality of assignments may be retrieved from (e.g., and/or determined by analyzing) a user history database). The user history database may be stored on one or more servers (e.g., associated with the service) (e.g., accessed by the first device via a network connection). Each assignment of the plurality of assignments may indicate that the content item was (e.g., previously) presented to a user of the plurality of users. Accordingly, the content item may have (e.g., previously) been presented to each user of the plurality of users. Each user in the user history database may be linked with an identifier identifying one or more content items presented to the user (e.g., and/or transmitted to the device associated with the user).

Alternatively and/or additionally, the plurality of assignments may be retrieved from (e.g., and/or determined by analyzing) a user targeting database. The user targeting database may be stored on one or more servers (e.g., associated with the service) (e.g., accessed by the first device via a network connection). Each assignment of the plurality of assignments may indicate that the content item is targeted (e.g., and/or was previously targeted) to a user of the plurality of users. Accordingly, the content item may have (e.g., previously) been presented to the user and/or the content item may be targeted to (e.g., and/or assigned to) the user such that the content item may (e.g., later) be transmitted to a device of the user and/or may be presented to the user (e.g., automatically) (e.g., while the user interacts with the service and/or a different service).

At 488, the response content item may be transmitted to a plurality of devices. Each device of the plurality of devices may be associated with a user of the plurality of users. For example, the response content item may be assigned to the plurality of users. A second user, of the plurality of users, may (e.g., later) access and/or interact with the service (e.g., and/or a different service). Responsive to the second user accessing and/or interacting with the service (e.g., and/or the different service), the response content item may be transmitted to a second device (e.g., associated with the second user) and/or may be presented to the second user (e.g., automatically) (e.g., while the second user interacts with the service and/or the different service).

FIGS. 5A-5D illustrate examples of a system 501 for transmitting response content items to devices. A user, such as user Jake, (e.g., and/or a device 500 associated with the user) may access and/or interact with a service, such as a website, an application, etc. that provides for accessing and/or interacting with a targeting interface to identify one or more content items and/or transmit one or more response content items to one or more devices.

Figure 5A:
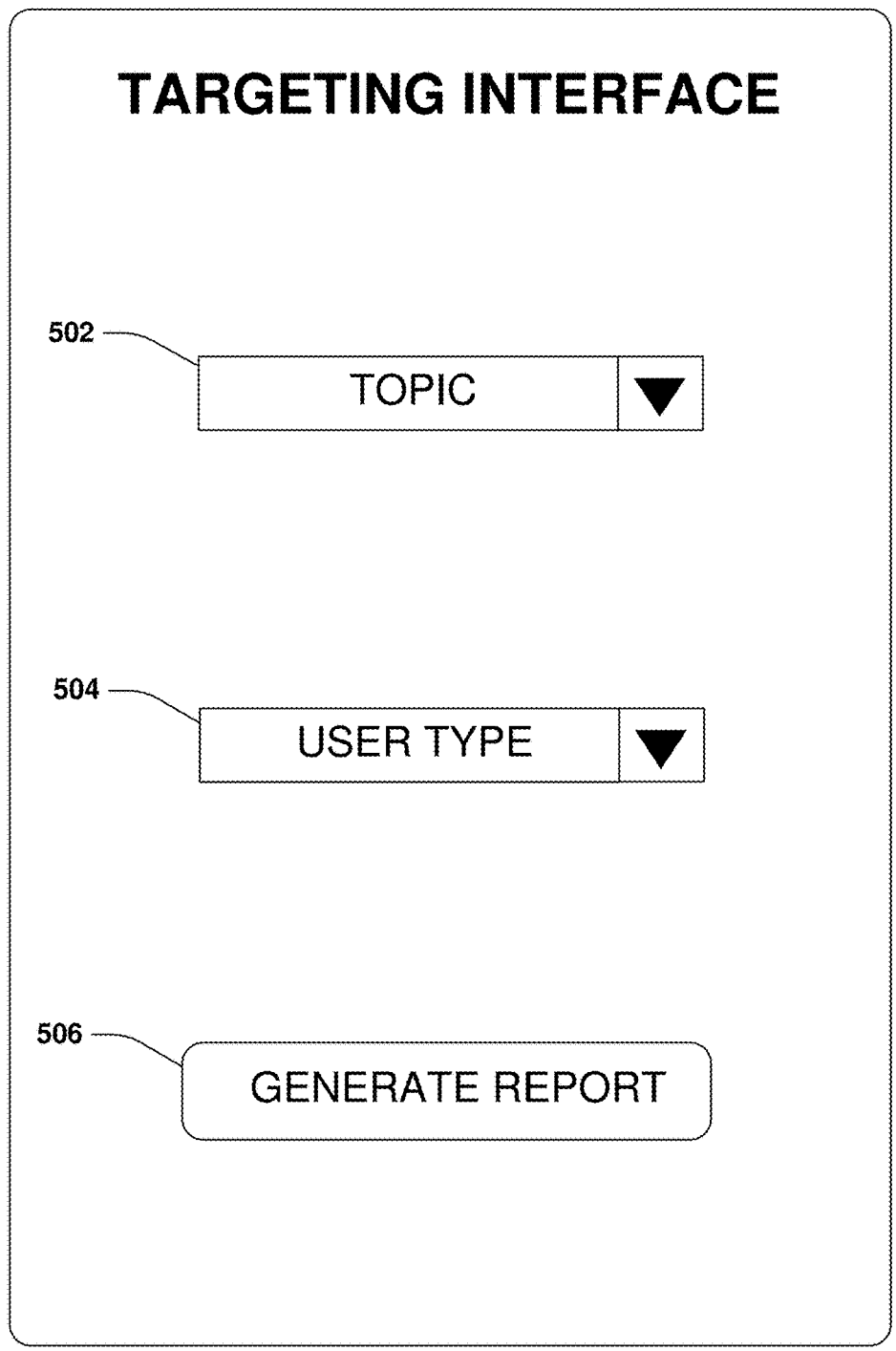
FIG. 5A is a component block diagram illustrating an example system for transmitting response content items to devices, where a graphical user interface of a device is controlled to display a targeting interface comprising a first selectable input corresponding to a topic and/or a second selectable input corresponding to a user type.

FIG. 5A illustrates a graphical user interface of the device 500 being controlled to display the targeting interface. The targeting interface may comprise a first selectable input 502 corresponding to a topic and/or a second selectable input 504 corresponding to a user type. Responsive to a selection of the first selectable input 502, a list of topics may be presented (e.g., via the targeting interface). The topic may be selected from the list of topics. In some examples, the list of topics may comprise "All Topics", "Political Campaigns", "Environmental Awareness", etc. Responsive to a selection of the second selectable input 504, a plurality of selectable inputs may be presented (e.g., via the targeting interface) corresponding to demographic parameters, behavior and/or settings associated with the user type. For example, an age-range, one or more locations, etc. corresponding to the user type may be selected. In some examples, a selectable input of the plurality of selectable inputs may correspond to all user types. In some examples, the targeting interface may (e.g., further) comprise a third selectable input 506 corresponding to a request to generate a report based upon the topic (e.g., selected via the first selectable input 502) and/or the user type (e.g., selected via the second selectable input 504). In some examples, one or more of the selectable inputs may be a menu, such as a drop-down menu.

Figure 5B:
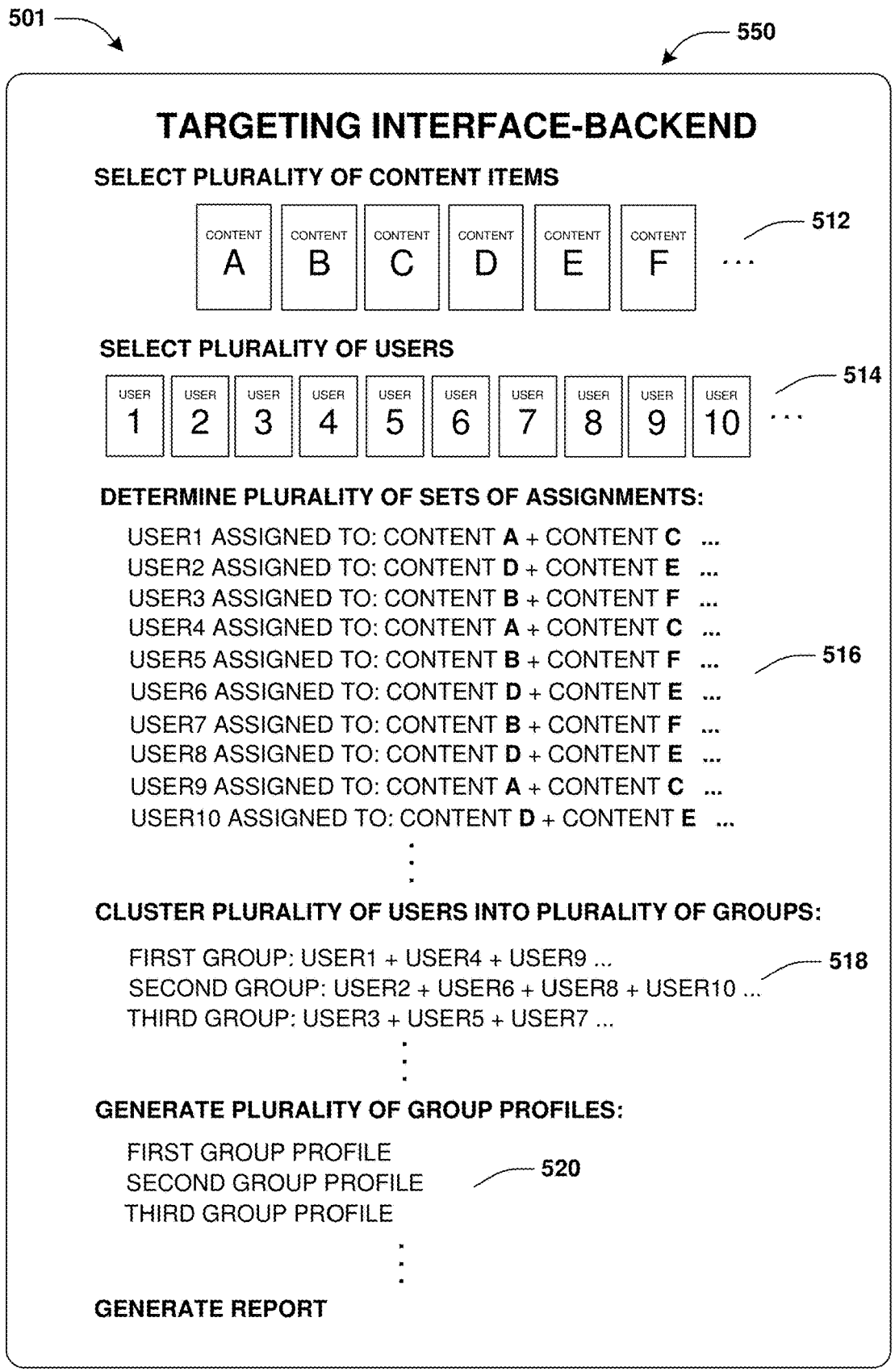
FIG. 5B is a component block diagram illustrating an example system for transmitting response content items to devices, where a backend system generates a report based upon a topic and/or a user type.

FIG. 5B illustrates a backend system 550 (e.g., on the device 500 of the user, on a server connected to the device 500 via a network, etc.) that may generate a report based upon the topic and/or the user type. For example, a plurality of content items 512 may be selected from a content items database based upon the topic. In some examples, each content item in the content items database may be linked with an identifier identifying one or more topics. The plurality of content items 512 may be selected responsive to determining that identifiers of the plurality of content items 512 are similar to the topic.

A plurality of users 514 may (e.g., then) be selected from a user database based upon the user type. In some examples, each user in the database of users may be linked with an identifier identifying one or more user types and/or characteristics (e.g., demographic parameters, behavior and/or settings). The plurality of users 514 may be selected responsive to determining that identifiers of the plurality of users 514 are similar to the user type.

A plurality of sets of assignments 516 corresponding to the plurality of users 514 may (e.g., then) be determined. Each set of assignments of the plurality of sets of assignments 516 may correspond to a set of content items assigned to a user of the plurality of users 514. The plurality of users 514 may (e.g., then) be clustered into a plurality of groups of users 518. In some examples, the plurality of users 514 may be clustered into the plurality of groups of users 518 by performing PCA, k-means clustering, bag-of-words modeling, cosine similarity measurements, implementation of a binary search tree (e.g., such as k-d tree) and/or one or more (e.g., other) clustering techniques.

A plurality of group profiles 520 may (e.g., then) be generated (e.g., based upon the plurality of groups of users 518). Each group profile of the plurality of group profiles 520 may correspond to a group of users of the plurality of groups of users 518. In some examples, information comprising demographic parameters, behavior and/or settings associated with the plurality of users or a plurality of devices (e.g., associated with the plurality of users) may be retrieved from the user history database and/or the user database (e.g., and/or a device settings database). The demographic parameters may comprise locations, ages, genders, education levels, income levels, marital statuses, occupations, religions, family sizes, etc. of (e.g., each user of) the plurality of users 514. The behavior may comprise interests (e.g., past viewed content items, liked content items, comments, etc.) of (e.g., each user of) the plurality of users 514.

In some examples, each group profile of the plurality of group profiles 520 may comprise a combination of a portion of the information (e.g., comprising the demographic parameters, the behavior and/or the settings), wherein the portion of the information corresponds to a group of users (e.g., of the plurality of groups of users 518) corresponding to the group profile. In an example, a first set of information, of the information, corresponding to a first group of users, may be combined to generate a first group profile corresponding to the first group of users. Accordingly, the first group profile may comprise first aggregate information comprising a combination of the first set of information (e.g., corresponding to the first group of users). In some examples, each group profile of the plurality of group profiles 520 may (e.g., further) comprise characteristics associated with one or more content items, wherein at least a portion of a group of users corresponding to the group profile may be assigned to the one or more content items.

The report may (e.g., then) be generated comprising one or more representations of the plurality of group profiles 520. The report may comprise a plurality of graphical objects. Each graphical object of the plurality of graphical objects may comprise one or more representations of a group profile of the plurality of group profiles 520. For example, the plurality of graphical objects may comprise a plurality of maps, wherein each map of the plurality of maps may comprise one or more representations of a group profile of the plurality of group profiles 520. The report may (e.g., further) comprise a plurality of summaries. Each summary of the plurality of summaries may comprise one or more representations of a group profile of the plurality of group profiles 520.

Figure 5C:
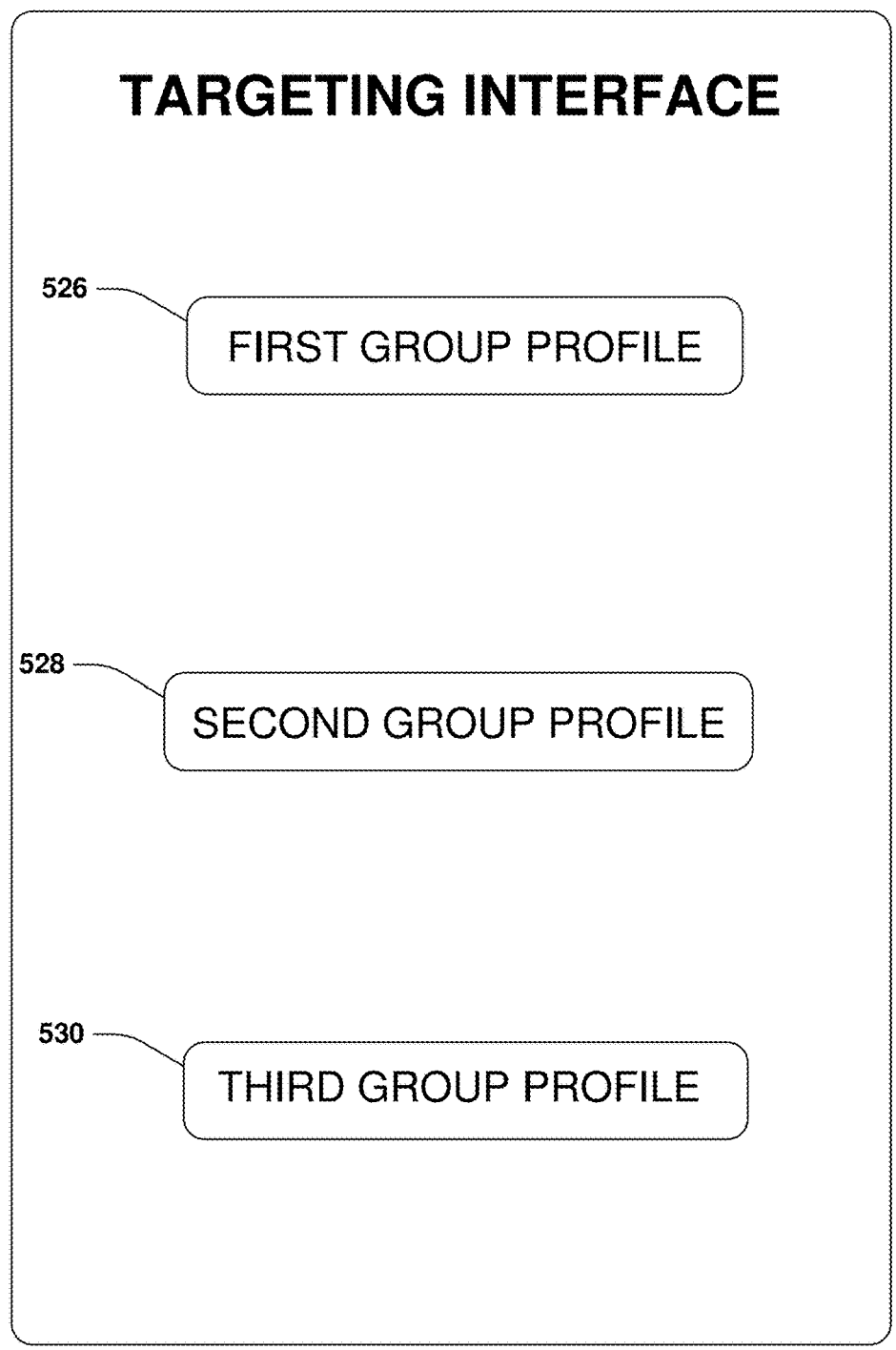
FIG. 5C is a component block diagram illustrating an example system for transmitting response content items to devices, where a graphical user interface of a device is controlled to display a targeting interface comprising a fourth selectable input corresponding to a first group profile, a fifth selectable input corresponding to a second group profile and/or a sixth selectable input corresponding to a third group profile.

FIG. 5C illustrates the graphical user interface of the device 500 being controlled to display the targeting interface. The targeting interface may comprise a fourth selectable input 526 corresponding to the first group profile of the plurality of group profiles 520, a fifth selectable input 528 corresponding to a second group profile of the plurality of group profiles 520 and/or a sixth selectable input 530 corresponding to a third group profile of the plurality of group profiles 520. For example, a selection of the fourth selectable input 526 may be received (e.g., via the targeting interface).

Figure 5D:
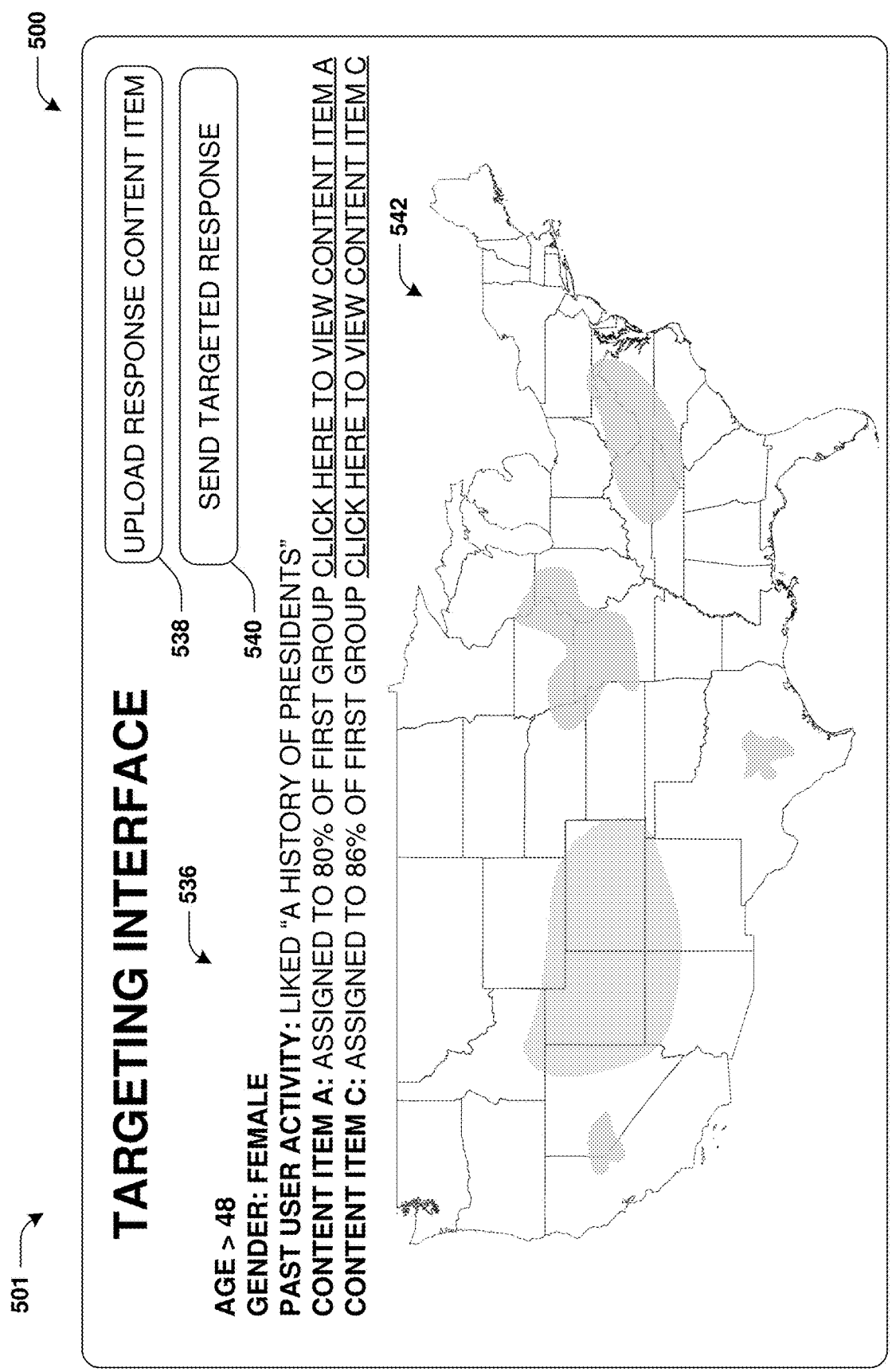
FIG. 5D is a component block diagram illustrating an example system for transmitting response content items to devices, where a graphical user interface of a device is controlled to display a targeting interface comprising a first summary corresponding to a first group profile, a first graphical object corresponding to the first group profile, a seventh selectable input corresponding to uploading of a response content item to one or more servers and/or an eighth selectable input corresponding to a request to transmit the response content item to a second plurality of devices.

FIG. 5D illustrates the graphical user interface of the device 500 being controlled to display the targeting interface. The targeting interface may comprise a first summary 536 corresponding to the first group profile of the plurality of group profiles 520, a first graphical object 542 corresponding to the first group profile, a seventh selectable input 538 corresponding to uploading of a response content item to one or more servers (e.g., of the service) and/or an eighth selectable input 540 corresponding to a request to transmit the response content item to a second plurality of devices associated with the first group profile.

The first summary 536 may comprise one or more representations of the first group profile. For example, the first summary 536 may comprise one or more representations of the first aggregate information (e.g., an age-range, a gender, a past user activity) corresponding to the first group profile. The first summary 536 may (e.g., further) comprise one or more representations of characteristics associated with a first content item "CONTENT ITEM A" and/or characteristics associated with a second content item "CONTENT ITEM C". The first summary 536 may (e.g., further) comprise a first link for viewing and/or downloading the first content item and/or a second link for viewing and/or downloading the second content item. The first graphical object 542 may comprise a map illustrating one or more locations associated with the first group profile and/or the first group of users.

Responsive to (e.g., receiving) a selection of the seventh selectable input 538, the targeting interface may provide for uploading of the response content item to the one or more servers (e.g., of the service) (e.g., from the first device). Responsive to (e.g., receiving) a selection of the eighth selectable input 540, a list of users may be generated based upon the first group profile. For example, the user database and/or the user history database may be evaluated based upon the first group profile. Users of the user database and/or the user history database may be compared to the first group profile to generate the list of users. For example, the list of users may comprise a second plurality of users. Each user of the second plurality of users may have a similarity to the first group profile exceeding a threshold.

The response content item may (e.g., then) be transmitted to a second plurality of devices. Each device of the second plurality of devices may be associated with a user in the list of users. For example, the response content item may be assigned to the second plurality of users (e.g., of the list of users). A second user, of the second plurality of users, may (e.g., later) access and/or interact with the service (e.g., and/or a different service). Responsive to the second user accessing and/or interacting with the service (e.g., and/or the different service), the response content item may be transmitted to a second device (e.g., associated with the second user) and/or may be presented to the second user (e.g., automatically) (e.g., while the second user interacts with the service and/or the different service).

FIGS. 6A-6D illustrate examples of a system 601 for generating a list of content items based upon a user profile and/or transmitting response content items to devices. A user, such as user *Julia*, (e.g., and/or a device 600 associated with the user) may access and/or interact with a service, such as a website, an application, etc. that provides for accessing and/or interacting with a user profile interface.

Figure 6A:
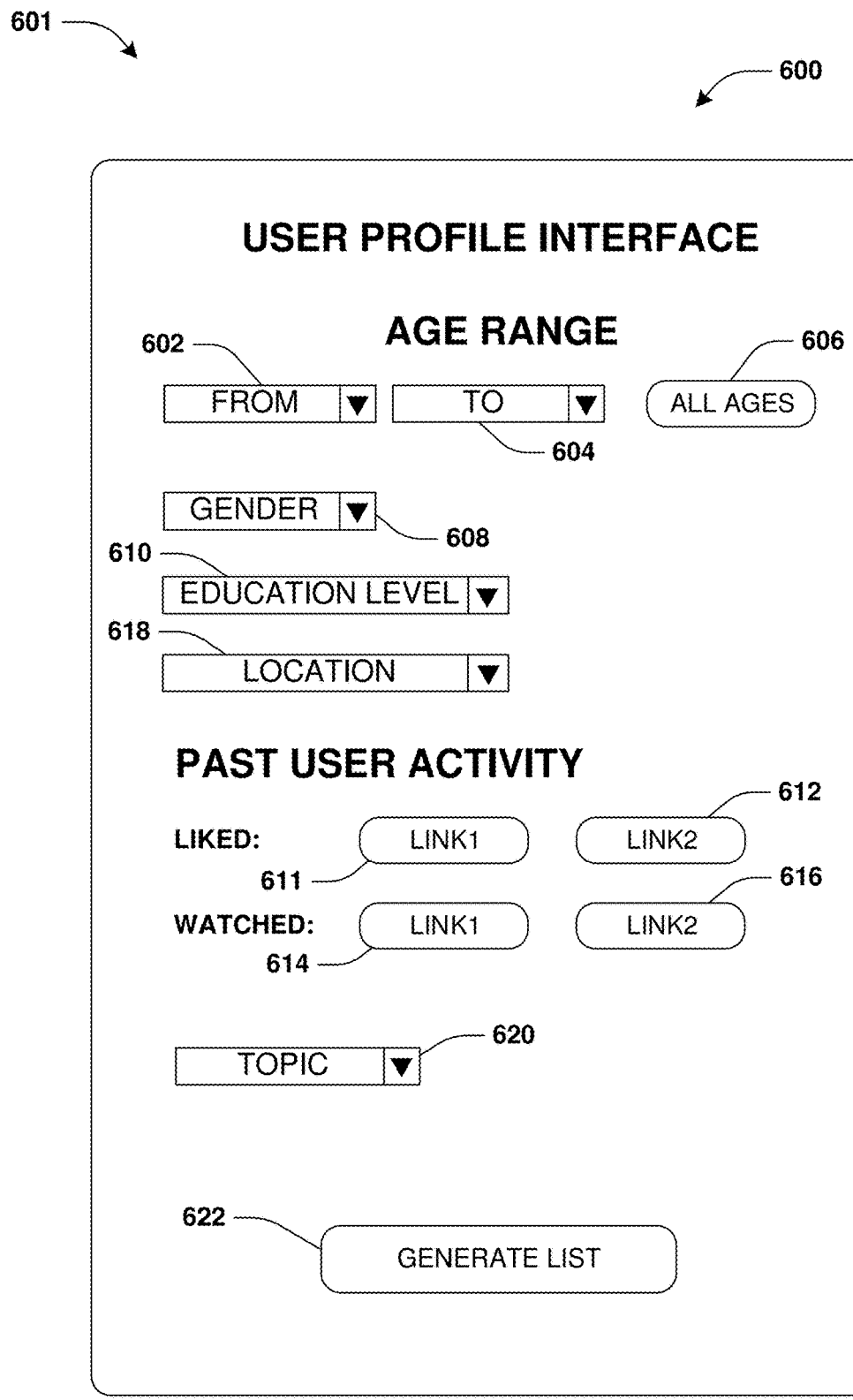
FIG. 6A is a component block diagram illustrating an example system for generating a list of content items and/or transmitting response content items to devices, where a graphical user interface of a device is controlled to display a user profile interface comprising a plurality of selectable inputs associated with characteristics of a user profile.

FIG. 6A illustrates a graphical user interface of the device 600 being controlled to display the user profile interface. The user profile interface may provide for viewing and/or selecting characteristics of a user profile. The user profile interface may comprise a plurality of selectable inputs associated with characteristics of the user profile. For example, the characteristics may comprise demographic parameters, behavior and/or settings associated with the user profile. For example, the user profile interface may comprise a first selectable input 602, a second selectable input 604 and/or a third selectable input 606 corresponding to an age-range associated with the user profile. For example, the first selectable input 602 may correspond to a first limit of the age-range, the second selectable input 604 may correspond to a second limit of the age-range and/or the third selectable input 606 may correspond to all ages. The user profile interface may (e.g., further) comprise a fourth selectable input 608 corresponding to a gender associated with the user profile, a fifth selectable input 610 corresponding to an education level associated with the user profile and/or a sixth selectable input 618 corresponding to one or more locations associated with the user profile.

The user profile may (e.g., further) comprise a seventh selectable input 611 and/or an eighth selectable input 612 corresponding to one or more content items of interest (e.g., and/or previously liked) associated with the user profile. For example, responsive to a selection of the seventh selectable input 611 and/or the eighth selectable input 612, the user profile interface may provide for inputting one or more links corresponding to the one or more content items of interest. The user profile may (e.g., further) comprise a ninth selectable input 614 and/or a tenth selectable input 616 corresponding to one or more presented content items associated with the user profile. For example, responsive to a selection of the ninth selectable input 614 and/or the tenth selectable input 616, the user profile interface may provide for inputting one or more second links corresponding to the one or more presented content items. The user profile may (e.g., further) comprise an eleventh selectable input 620 corresponding to a topic. Accordingly, the characteristics (e.g., the demographic parameters, the behavior and/or the settings) associated with the user profile and/or the topic may be selected (e.g., by the user) using the plurality of selectable inputs.

The user profile interface may (e.g., further) comprise a twelfth selectable input 622 corresponding to a request to generate a list of content items associated with the user profile. The request to generate the list of content items may be received via the user profile interface (e.g., by receiving a selection of the twelfth selectable input 622). The request may comprise the topic and/or selections of characteristics of the user profile. Responsive to a selection of the twelfth selectable input 622 a plurality of content items may be selected from a content items database based upon the topic. A set of content items may (e.g., then) be selected from amongst the plurality of content items based upon the user profile. In some examples, the request may comprise the topic (e.g., but not the user profile), while in other examples, the request may comprise the user profile (e.g., but not the topic).

Alternatively and/or additionally, a plurality of users may be selected from a user database. A plurality of sets of assignments of the plurality of content items corresponding to the plurality of users may be determined. Each set of assignments of the plurality of sets of assignments may correspond to a group of users (e.g., of the plurality of users) a content item of the plurality of content items is assigned to.

Accordingly, a plurality of groups of users may be determined based upon the plurality of sets of assignments. Each group of users of the plurality of groups of users may correspond to a group of users a content item of the plurality of content items is assigned to.

A plurality of group profiles may be generated (e.g., based upon the plurality of groups of users). Each group profile of the plurality of group profiles may correspond to a group of users of the plurality of groups of users (e.g., that) a content item of the plurality of content items is assigned to. In some examples, information comprising demographic parameters, behavior and/or settings associated with the plurality of users or a plurality of devices (e.g., associated with the plurality of users) may be retrieved from a user history database and/or the user database (e.g., and/or a device settings database).

In some examples, each group profile of the plurality of group profiles may comprise a combination of a portion of the information (e.g., comprising the demographic parameters, the behavior and/or the settings), wherein the portion of the information corresponds to a group of users (e.g., of the plurality of groups of users) corresponding to the group profile. Accordingly, the set of content items may be selected responsive to determining that group profiles of a set of group profiles (e.g., of the plurality of group profiles) corresponding to the set of content items are similar to the user profile.

The list of content items may (e.g., then) be generated based upon a combination of representations of the set of content items. A report comprising the list of contents may be generated. The report may comprise a plurality of links. Each link of the plurality of links may correspond to a content item of the list of content items. Alternatively and/or additionally, the report may comprise a plurality of graphical objects. Each graphical object may comprise one or more representations of a group profile of the set of group profiles corresponding to the set of content items. For example, the plurality of graphical objects may comprise one or more representations of a group profile of the set of group profiles. The report may (e.g., further) comprise a plurality of summaries. Each summary of the plurality of summaries may comprise one or more representations of a group profile of the set of group profiles and/or one or more representations of a content item of the set of content items.

Figure 6B:
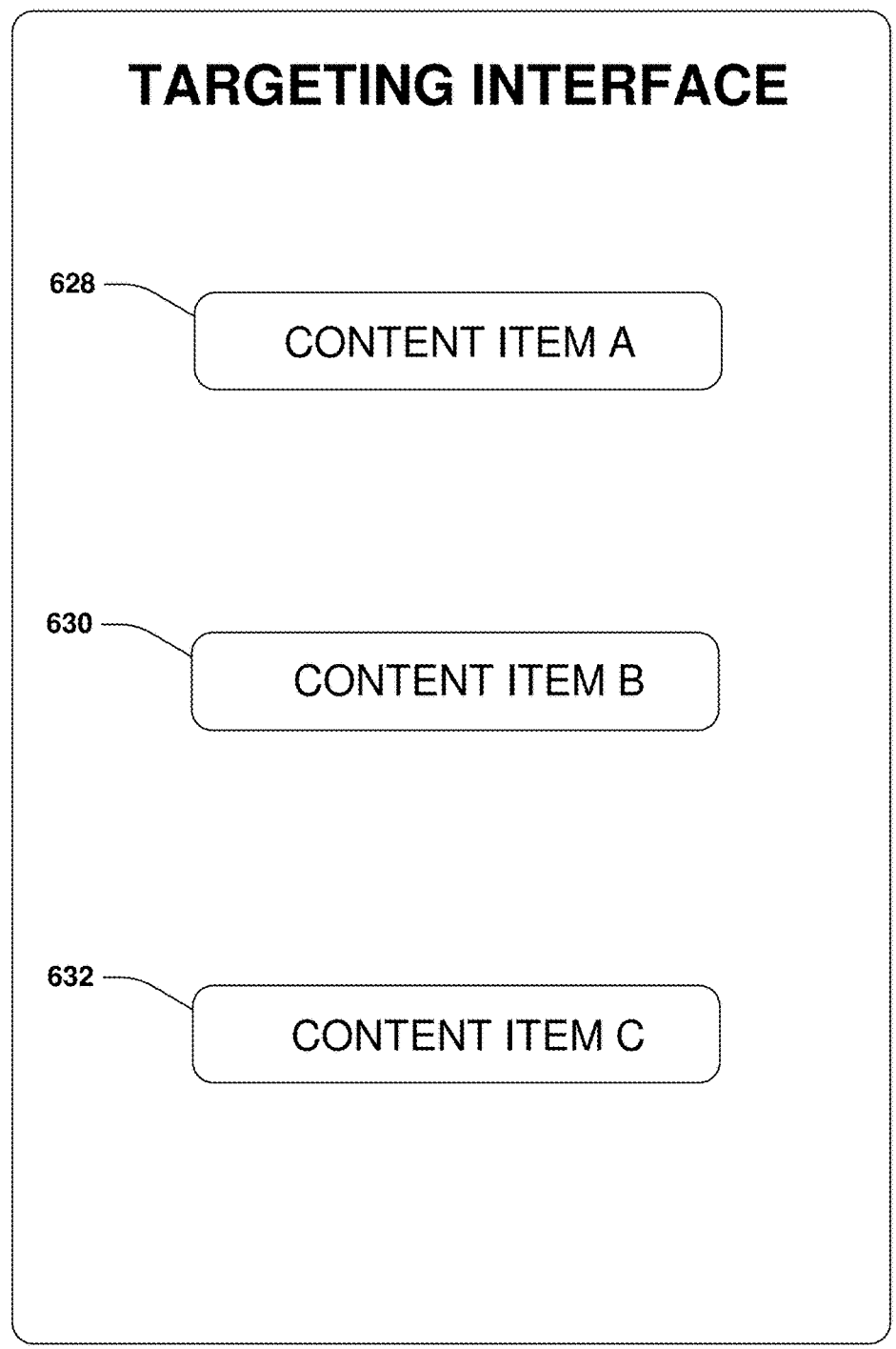
FIG. 6B is a component block diagram illustrating an example system for generating a list of content items and/or transmitting response content items to devices, where a graphical user interface of a device is controlled to display a targeting interface comprising a thirteenth selectable input corresponding to a first content item, a fourteenth selectable input corresponding to a second content item and/or a fifteenth selectable input corresponding to a third content item.

FIG. 6B illustrates the graphical user interface of the device 600 being controlled to display a targeting interface. The targeting interface may comprise a thirteenth selectable input 628 corresponding to a first content item "CONTENT ITEM A" of the set of content items, a fourteenth selectable input 630 corresponding to a second content item "CONTENT ITEM B" of the set of content items and/or a fifteenth selectable input 632 corresponding to a third content item "CONTENT ITEM C" of the set of content items. For example, a selection of the thirteenth selectable input 628 may be received (e.g., via the targeting interface).

Figure 6C:
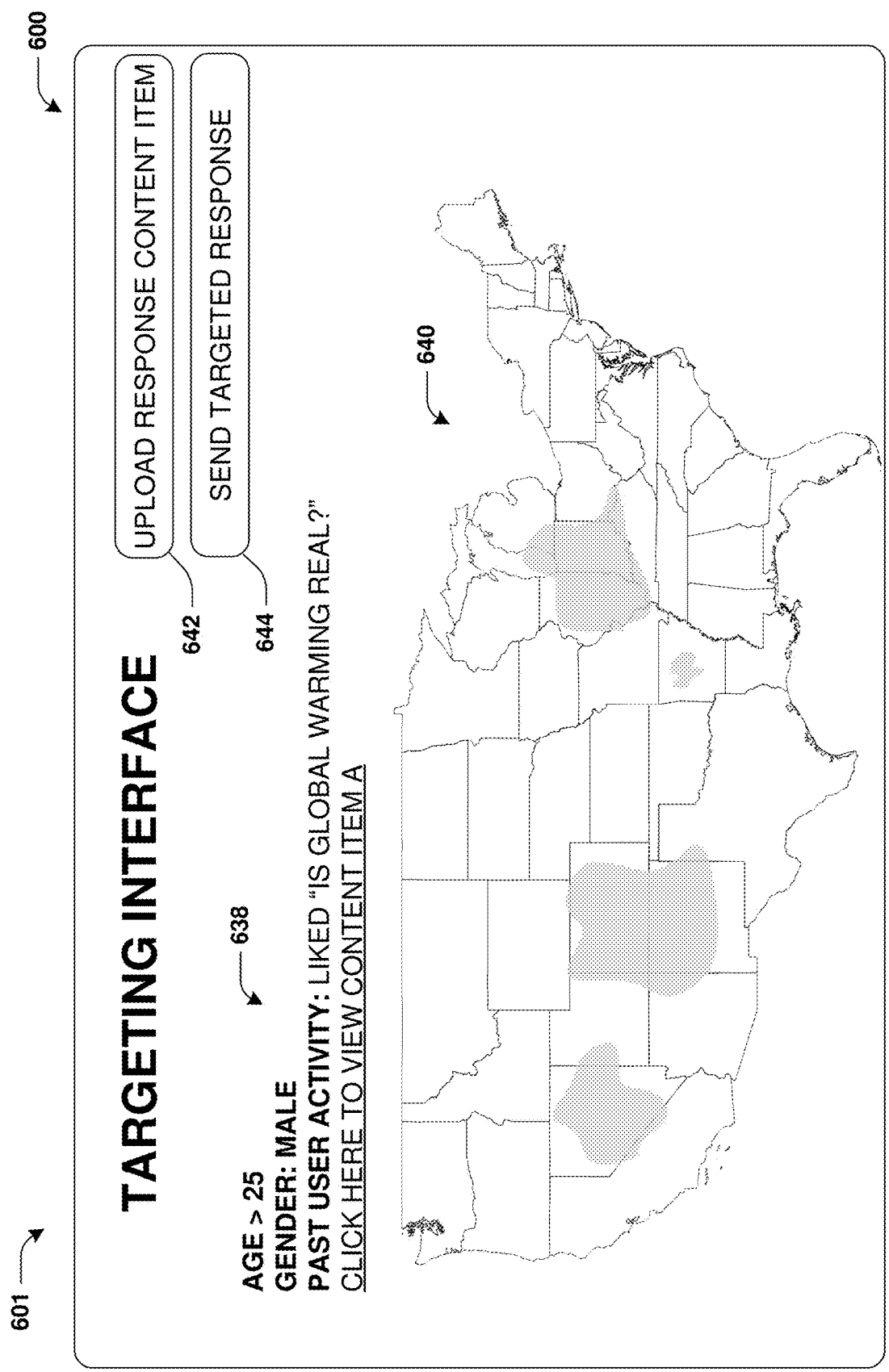
FIG. 6C is a component block diagram illustrating an example system for generating a list of content items and/or transmitting response content items to devices, where a graphical user interface of a device is controlled to display a targeting interface comprising a first summary corresponding to a first group profile, a first graphical object corresponding to the first group profile, a sixteenth selectable input corresponding to uploading of a response content item to one or more servers and/or a seventeenth selectable input corresponding to a request to transmit the response content item to a second plurality of devices.

FIG. 6C illustrates the graphical user interface of the device 600 being controlled to display the targeting interface. The targeting interface may comprise a first summary 638 corresponding to a first group profile (e.g., of the set of group profiles) corresponding to the first content item, a first graphical object 640 corresponding to the first group profile, a sixteenth selectable input 642 corresponding to uploading of a response content item to one or more servers (e.g., of the service) and/or a seventeenth selectable input 644 corresponding to a request to transmit the response content item to a second plurality of devices associated with the first group profile and/or the user profile.

The first summary 638 may comprise one or more representations of the first group profile. For example, the first summary 638 may comprise one or more representations of first aggregate information (e.g., an age-range, a gender, a past user activity) corresponding to the first group profile. The first summary 638 may (e.g., further) comprise a first link for viewing and/or downloading the first content item. The first graphical object 640 may comprise a map illustrating one or more locations associated with the first group profile and/or a first group of users associated with the first group profile.

Responsive to (e.g., receiving) a selection of the sixteenth selectable input 642, the targeting interface may provide for uploading of the response content item to the one or more servers (e.g., of the service) (e.g., from the device 600). Responsive to (e.g., receiving) a selection of the seventeenth selectable input 644, a list of users may be generated based upon the user group profile and/or the first group profile.

Figure 6D:
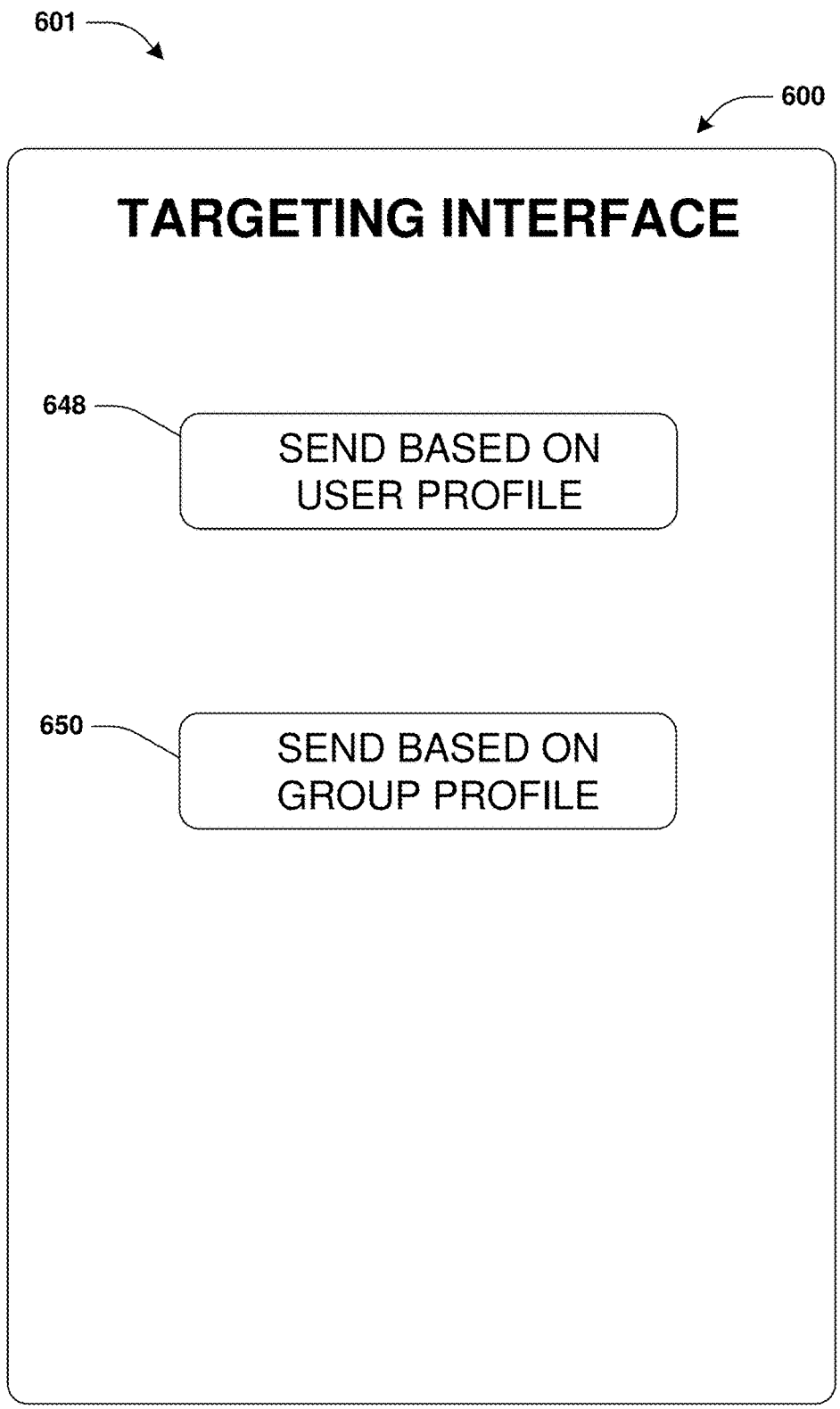
FIG. 6D is a component block diagram illustrating an example system for generating a list of content items and/or transmitting response content items to devices, where a graphical user interface of a device is controlled to display a targeting interface comprising an eighteenth selectable input corresponding to transmitting a response content item to devices based upon a user profile and/or a nineteenth selectable input corresponding to transmitting the response content item to devices based upon a first group profile.

FIG. 6D illustrates the graphical user interface of the device 600 being controlled to display the targeting interface. The targeting interface may comprise an eighteenth selectable input 648 corresponding to transmitting the response content item to devices based upon the user profile and/or a nineteenth selectable input 650 corresponding to transmitting the response content item to devices based upon the first group profile.

For example, responsive to receiving a selection of the eighteenth selectable input 648, the list of users may be generated based upon the user profile. For example, the user database and/or the user history database may be evaluated based upon the user profile. Users of the user database and/or the user history database may be compared to the user profile to generate the list of users. For example, the list of users may comprise a second plurality of users. Each user of the second plurality of users may have a similarity to the user profile exceeding a threshold.

Alternatively and/or additionally, responsive to receiving a selection of the nineteenth selectable input 650, the list of users may be generated based upon the first group profile (e.g., associated with the first content item). For example, the user database and/or the user history database may be evaluated based upon the first group profile. Users of the user database and/or the user history database may be compared to the first group profile to generate the list of users. For example, each user of the second plurality of users (e.g., of the list of users) may have a similarity to the first group profile exceeding a threshold.

The response content item may (e.g., then) be transmitted to a second plurality of devices. Each device of the second plurality of devices may be associated with a user in the list of users. For example, the response content item may be assigned to the second plurality of users (e.g., of the list of users). A second user, of the second plurality of users, may (e.g., later) access and/or interact with the service (e.g., and/or a different service). Responsive to the second user accessing and/or interacting with the service (e.g., and/or the different service), the response content item may be transmitted to a second device (e.g., associated with the second user) and/or may be presented to the second user (e.g., automatically) (e.g., while the second user interacts with the service and/or the different service).

Figure 7A:
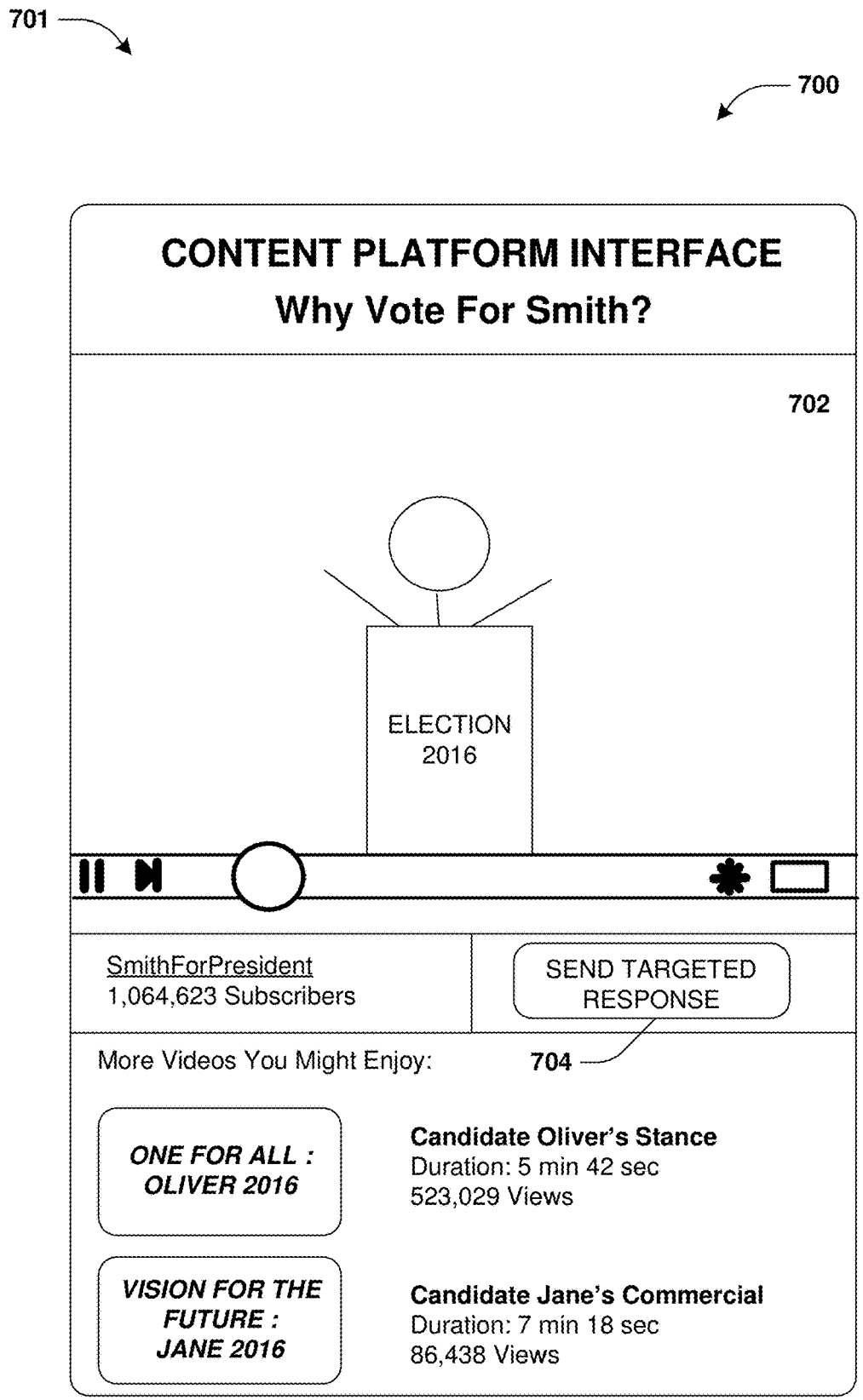
FIG. 7A is a component block diagram illustrating an example system for transmitting response content items to devices, where a graphical user interface of a device is controlled to display a content platform interface comprising a content item and/or a first selectable input corresponding to the content item.
Figure 7B:
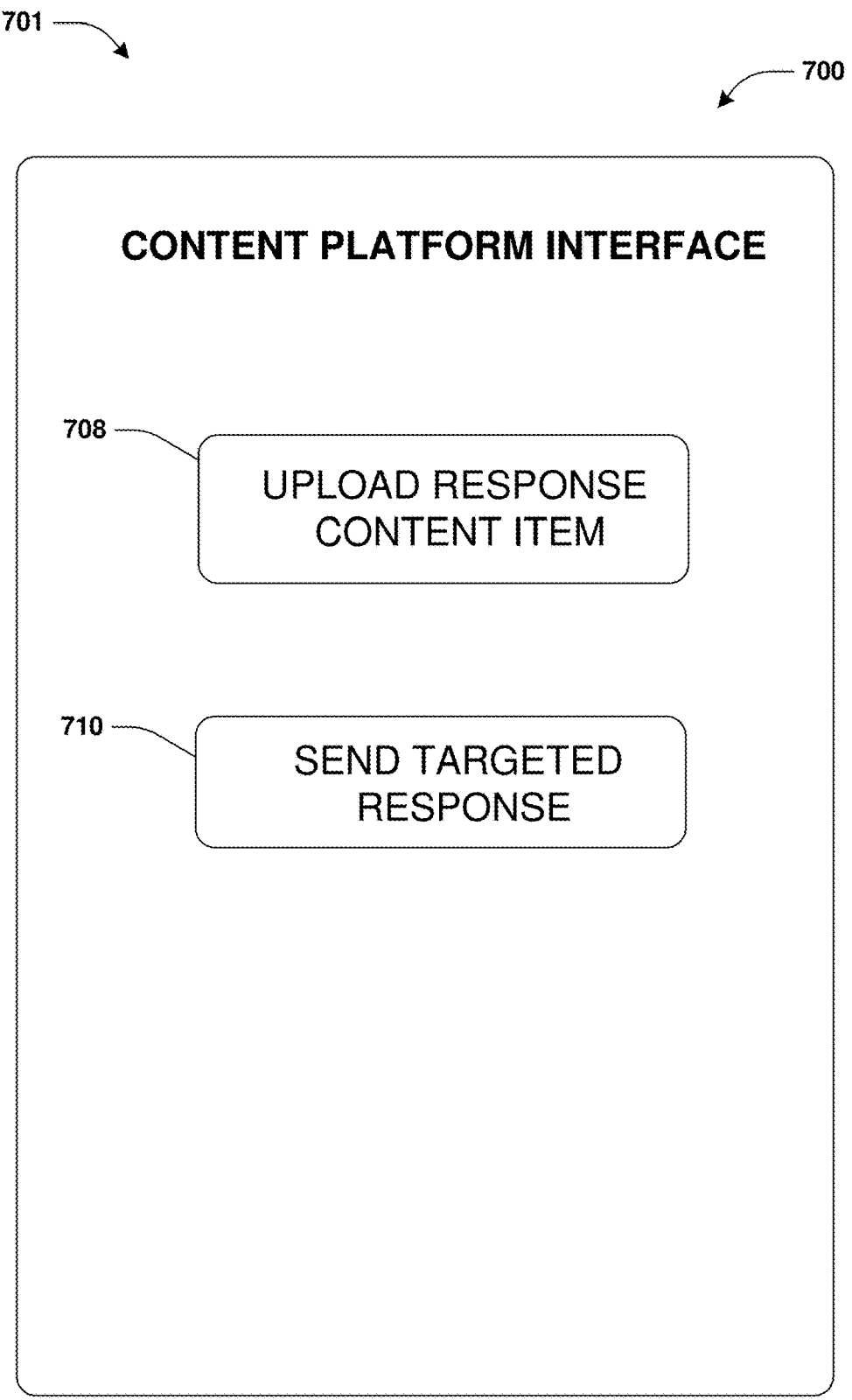
FIG. 7B is a component block diagram illustrating an example system for transmitting response content items to devices, where a graphical user interface of a device is controlled to display a content platform interface comprising a second selectable input corresponding to uploading of a response content item to one or more servers and/or a third selectable input corresponding to a request to transmit the response content item to devices associated with a content item.

FIGS. 7A-7B illustrate examples of a system 701 for transmitting response content items to devices. A user, such as user John, (e.g., and/or a device 700 associated with the user) may access and/or interact with a service, such as a website, an application, etc. that provides a content platform interface for viewing and/or downloading content items from one or more servers (e.g., of the website, the application, etc.). Alternatively and/or additionally, the service may (e.g., further) provide for transmitting one or more response content items to one or more devices.

FIG. 7A illustrates a graphical user interface of the device 700 being controlled to display the content platform interface. The content platform interface may comprise a content item 702 "Why Vote For Smith?" and/or a first selectable input 704 corresponding to the content item 702. For example, the content item 702 may be presented to the first user (e.g., via the content platform interface). The first selectable input 704 may be adjacent to (e.g., below) the content item 702. The first selectable input 704 may correspond to a request for a targeted response to the content item. A request for the targeted response to the content item 702 may be received responsive to a selection of the first selectable input 704. For example, the first selectable input 704 may be selected by the user (e.g., and/or the device 700).

FIG. 7B illustrates the graphical user interface of the device 700 being controlled to display the content platform interface. The content platform interface may comprise a second selectable input 708 corresponding to uploading of a response content item to one or more servers (e.g., of the service) and/or a third selectable input 710 corresponding to a request to transmit the response content item to devices associated with the content item 702. For example, responsive to (e.g., receiving) a selection of the second selectable input 708, the content platform interface may provide for uploading of the response content item to the one or more servers (e.g., of the service) (e.g., from the device 700).

Responsive to (e.g., receiving) a selection of the third selectable input 710, a plurality of assignments of the content item 702 to a plurality of users may be determined. Each assignment of the plurality of assignments may correspond to a user of the plurality of users (e.g., that) the content item 702 is assigned to. Accordingly, each user of the plurality of users may be assigned to the content item 702. The response content item may (e.g., then) be transmitted to a plurality of devices. Each device of the plurality of devices may be associated with a user of the plurality of users. For example, the response content item may be assigned to the plurality of users. A second user, of the plurality of users, may (e.g., later) access and/or interact with the service (e.g., and/or a different service). Responsive to the second user accessing and/or interacting with the service (e.g., and/or the different service), the response content item may be transmitted to a second device (e.g., associated with the second user) and/or may be presented to the second user (e.g., automatically) (e.g., while the second user interacts with the service and/or the different service).

It may be appreciated that the disclosed subject matter may assist a user (e.g., and/or a device associated with the user) in identifying and/or viewing content items (e.g., that may comprise misleading, false and/or unproven information about one or more issues), and/or may assist the user (e.g., and/or the device) in transmitting response content items associated with content items to devices (e.g., associated with the content items).

Implementation of at least some of the disclosed subject matter may improve performance of a computer to increase accuracy (e.g., of identifying content items, target users, etc.) and decrease errors, which may lead to benefits including, but not limited to, enabling the user to efficiently, quickly and accurately identify one or more content items (e.g., that may comprise misleading, false and/or unproven information about one or more issues) (e.g., as a result of a targeting interface and/or a content platform interface enabling the user to browse through, view and/or search for content items, as a result of the targeting interface enabling the user to browse through, view and/or search for group profiles and/or enabling the user to view content items corresponding to the group profiles, as a result of the group profiles having content item information associated with content items associated with the group profiles, etc.).

Alternatively and/or additionally, implementation of at least some of the disclosed subject matter may lead to benefits including enabling the user to efficiently, quickly and accurately identify, view and/or understand demographic parameters, behavior and/or settings associated with users that are assigned to content items (e.g., that may comprise misleading, false and/or unproven information about one or more issues) (e.g., as a result of generating a report comprising one or more representations of group profiles assigned to content items, as a result of each group profile comprising user information indicative of demographic parameters, behaviors and/or settings of users corresponding to the group profile, as a result of the report comprising graphical objects, such as maps, comprising one or more representations of the group profiles, as a result of the report comprising summaries comprising one or more representations of user information indicative of demographic parameters, behavior and/or settings associated with users of each group profile, as a result of the targeting interface enabling the user to browse through, view and/or search for group profiles, as a result of enabling the user to view and/or select characteristics of a user profile via a user profile interface, as a result of determining a plurality of content items associated with the user profile, as a result of generating a plurality of group profiles for the plurality of content items, as a result of enabling the user to view one or more representations of group profiles of the plurality of group profiles, etc.).

Alternatively and/or additionally, implementation of at least some of the disclosed subject matter may lead to benefits including enabling the user to efficiently and quickly (e.g., with decreased delay) respond to content items by transmitting response content items to devices associated with the content items (e.g., as a result of the targeting interface enabling the user to upload a response content item without opening and/or installing a separate application, as a result of the targeting interface enabling the user to transmit the response content item to a plurality of devices associated with a group profile associated with one or more content items without opening and/or installing a separate application, as a result of the targeting interface enabling the user to transmit the response content item to a plurality of devices associated with the user profile without opening and/or installing a separate application, as a result of a content platform interface enabling the user to transmit the response content item to a plurality of device associated with a plurality of users assigned to a selected content item without opening and/or installing a separate application, etc.).

Alternatively and/or additionally, implementation of at least some of the disclosed subject matter may improve the layout, arrangement and/or performance of a graphical user interface on a display of a computer, which may lead to benefits including a reduction in (e.g., and/or an improved usability of) screen space and/or an improved usability of a display (e.g., of the device) (e.g., as a result of the targeting interface enabling the user to browse, view and/or search for content items, as a result of the targeting interface enabling the user to browse through, view and/or search for group profiles and/or enabling the user to view content items corresponding to the group profiles, as a result of the targeting interface and/or the content platform interface enabling the user to upload the response content item without opening and/or installing a separate application, as a result of the targeting interface and/or the content platform interface enabling the user to transmit response content items to devices associated with content items without opening and/or installing a separate application, etc.). The improvement to the graphical user interface may increase the speed and/or accuracy with which the user can perform one or more tasks, including identifying and/or responding to content items of interest. It may be appreciated that speed and/or accuracy are particularly important where content items may set a narrative that, if not countered, may dominate one or more mediums and/or geographies, and may influence various events, such as elections, trades, sales, etc.

In some examples, at least some of the disclosed subject matter may be implemented on a client device, and in some examples, at least some of the disclosed subject matter may be implemented on a server (e.g., hosting a service accessible via a network, such as the Internet).

In some examples, a content item, as described herein, may be an image, text, audio, video, an interactive graphic, and/or a combination thereof. A content item may be a primary content of a platform, such as an (e.g., uploaded) video on a video-sharing site, or may be secondary content that is (e.g., selectively) displayed by the platform, such as an advertisement on the video-sharing site. It may be appreciated that a content item may be displayed in various contexts, such as blogs, video sites, search results, news sites, social media pages, etc.

Figure 8:
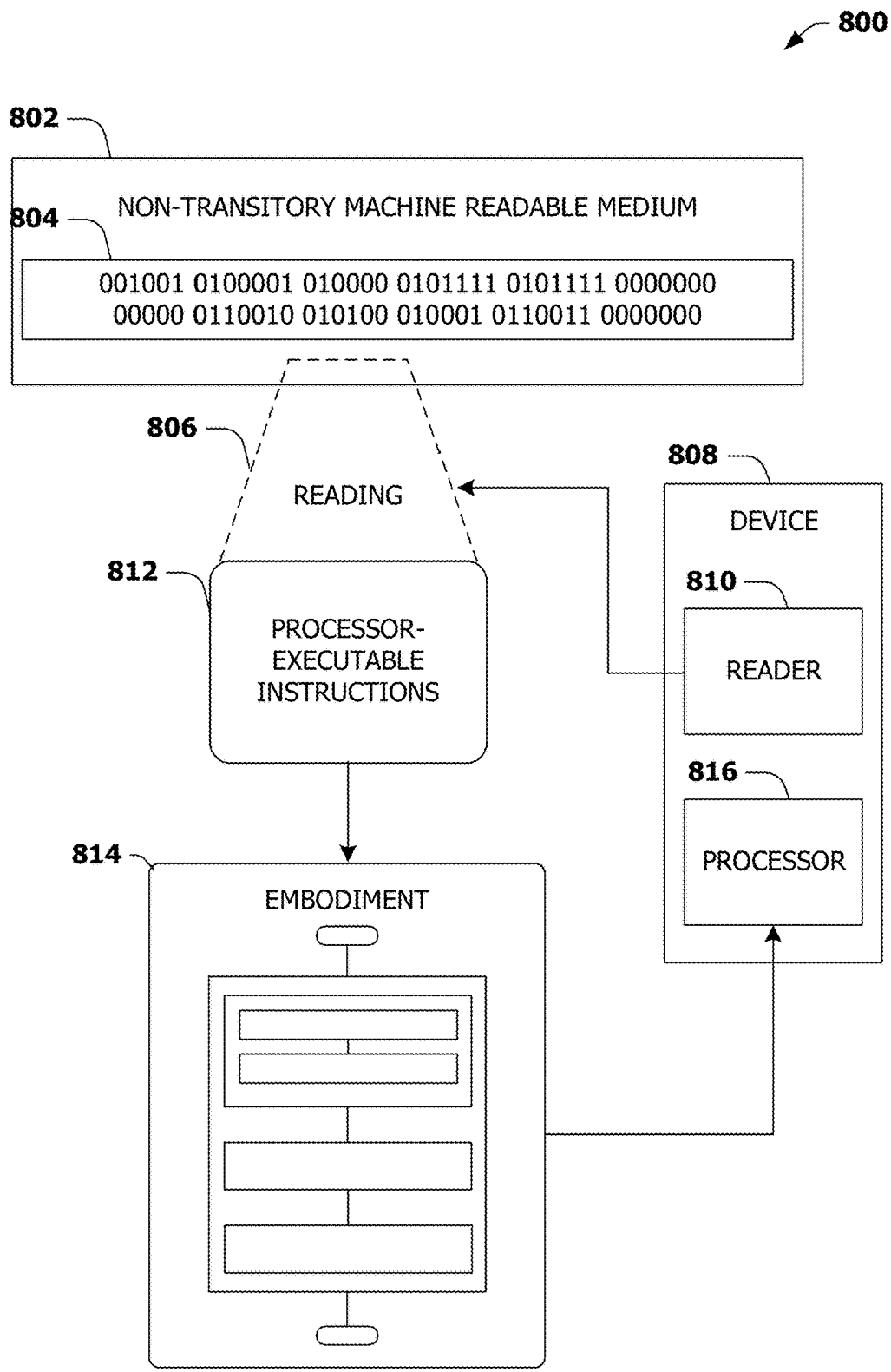
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIGS. 4A-4B, the example method 440 of FIG. 4C and/or the example method 480 of FIG. 4D, for example. In some embodiments, the processor-executable instructions 812 are configured to cause implementation of a system, such as at least some of the example system 501 of FIGS. 5A-5D, the example system 601 of FIGS. 6A-6D and/or the example system 701 of FIGS. 7A-7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving a user request to generate a report via a device, wherein the user request comprises a topic and a user type;
selecting a plurality of content items from a content items database based upon the topic;
selecting a plurality of users from a user database based upon the user type;
determining a plurality of sets of assignments of content items corresponding to the plurality of users, wherein each set of assignments of the plurality of sets of assignments corresponds to a set of content items assigned to a user of the plurality of users;
clustering the plurality of users into a plurality of groups of users based upon the plurality of sets of assignments;
generating a plurality of group profiles, wherein each group profile of the plurality of group profiles corresponds to a group of users of the plurality of groups of users and at least a portion of each group of users of the plurality of groups of users are assigned to one or more content items of the plurality of content items;
generating the report comprising one or more representations of the plurality of group profiles;
controlling a graphical user interface to display a first targeting interface comprising one or more selectable inputs, wherein each selectable input of the one or more selectable inputs corresponds to a group profile from the plurality of group profiles;
responsive to receiving a selection of a first group profile selectable input by a user from among the one or more selectable inputs displayed in the first targeting interface, displaying a second targeting interface comprising:
a portion of the report comprising first content associated with a first group profile associated with the first group profile selectable input;
a first input associated with selecting a response content item to be uploaded; and
a second input associated with transmitting a targeted response to at least one content item of the plurality of content items, wherein the at least one content item was transmitted to one or more devices associated with users of the first group profile prior to the displaying the second targeting interface;
responsive to receiving a user selection of the first input associated with selecting the response content item to be uploaded, identifying the response content item;
after identifying the response content item in association with the user selection of the first input, receiving, via the second targeting interface, a user selection of the second input associated with a second request for transmitting the targeted response, comprising the response content item, as a response to the at least one content item of the plurality of content items;
generating a list of users based upon the first group profile; and
transmitting, as the response to the at least one content item, the targeted response comprising the response content item to a plurality of devices, wherein each device of the plurality of devices is associated with a user in the list of users.

2. The method of claim 1, wherein the generating the list of users based upon the first group profile comprises including two or more users in the list of users based upon a determination that each user of the two or more users has a similarity to the first group profile exceeding a threshold.

3. The method of claim 1, comprising:
retrieving the plurality of sets of assignments from a user history database, wherein each assignment of the plurality of sets of assignments corresponds to a content item, of the plurality of content items, presented to a user of the plurality of users.

4. The method of claim 1, comprising:
retrieving the plurality of sets of assignments from a user targeting database, wherein each assignment of the plurality of sets of assignments corresponds to a content item, of the plurality of content items, targeted to a user of the plurality of users.

5. The method of claim 1,
the plurality of users clustered into the plurality of groups of users by performing at least one of principal component analysis, k-means clustering, bag-of-words modeling, cosine similarity measurements or implementation of a binary search tree.

6. The method of claim 1, comprising:
determining a plurality of weights corresponding to the plurality of content items based upon frequencies of assignments of each content item of the plurality of content items to users of the plurality of users, wherein the plurality of users are clustered into the plurality of groups of users based upon the plurality of weights.

7. The method of claim 1, at least a portion of a first group of users of the plurality of groups of users corresponding to the first group profile assigned to a first content item of the plurality of content items, wherein the first group profile corresponding to the first group of users comprises at least one of:
a first number of users, of the first group of users, assigned to the first content item;
a first proportion of the first number of users relative to a first total number of users of the first group of users;
a second number of users, of the plurality of users, assigned to the first content item;
a second proportion of the second number of users relative to a second total number of users of the plurality of users; or
a combination of the first proportion and the second proportion.

8. The method of claim 1,
the report comprising a plurality of graphical objects, wherein each graphical object of the plurality of graphical objects comprises one or more representations of a group profile of the plurality of group profiles.

9. The method of claim 8,
the plurality of graphical objects comprising a plurality of maps.

10. A computing device comprising:
a processor; and
memory comprising processor-executable instructions that when executed by the processor cause performance of operations, the operations comprising:

controlling a graphical user interface to display a user profile interface comprising one or more selectable inputs associated with characteristics of a user profile;

receiving, via the user profile interface, a user request to generate a list of content items associated with the user profile, wherein the user request comprises a topic and one or more selections of one or more characteristics of the user profile;

responsive to receiving the user request, selecting a plurality of content items from a content items database based upon the topic;

selecting a set of content items, from amongst the plurality of content items, based upon the user profile;

generating the list of content items based upon a combination of representations of the set of content items;

generating a report comprising the list of content items;

controlling the graphical user interface to display a first targeting interface comprising one or more second selectable inputs, wherein each selectable input of the one or more second selectable inputs corresponds to a content item from the set of content items;

responsive to receiving a selection of a first content item selectable input by a user from among the one or more selectable inputs displayed in the first targeting interface, displaying a second targeting interface comprising:

a portion of the report comprising first content associated with a first content item associated with the first content item selectable input;

a first input associated with selecting a response content item to be uploaded; and a second input associated with transmitting a targeted response to at least one content item of the plurality of content items, wherein the at least one content item was transmitted to one or more devices prior to the displaying the second targeting interface;

responsive to receiving a user selection of the first input associated with selecting the response content item to be uploaded, identifying the response content item;

after identifying the response content item in association with the user selection of the first input, receiving, via the second targeting interface, a user selection of the second input associated with a second request for transmitting the targeted response, comprising the response content item, as a response to the at least one content item of the plurality of content items; and responsive to the second request, transmitting, as the response to the at least one content item, the targeted response comprising the response content item to a plurality of devices.

11. The computing device of claim 10, the operations comprising:

generating a list of users based upon the user profile, wherein each device of the plurality of devices is associated with a user in the list of users.

12. The computing device of claim 10, the operations comprising:

selecting a plurality of users from a user database based upon the user profile;

determining a plurality of sets of assignments of content items of the plurality of content items corresponding to the plurality of users, wherein each set of assignments of the plurality of sets of assignments corresponds to a group of users, of the plurality of users, that a content item of the plurality of content items is assigned to;

determining a plurality of groups of users based upon the plurality of sets of assignments; and generating a plurality of group profiles, wherein each group profile corresponds to a group of users of the plurality of groups of users, wherein the set of content items are selected from amongst the plurality of content items based upon the plurality of group profiles.

13. The computing device of claim 12, wherein the report comprises one or more representations of each group profile, of a set of group profiles, associated with each content item of the set of content items.

14. The computing device of claim 12, the operations comprising:

retrieving information comprising at least one of demographic parameters, behavior or settings associated with at least one of the plurality of users or a second plurality of devices associated with the plurality of users from a memory structure, wherein the information is combined according to the plurality of groups of users to generate the plurality of group profiles corresponding to the plurality of groups of users.

15. The computing device of claim 12, the operations comprising:

retrieving the plurality of sets of assignments from a user history database, wherein each assignment of the plurality of sets of assignments corresponds to a content item, of the set of content items, presented to a user of the plurality of users.

16. The computing device of claim 12, the operations comprising:

retrieving the plurality of sets of assignments from a user targeting database, wherein each assignment of the plurality of sets of assignments corresponds to a content item, of the set of content items, targeted to a user of the plurality of users.

17. The computing device of claim 10, the characteristics comprising at least one of demographic parameters, behavior or settings associated with the user profile.

18. A non-transitory machine readable medium having stored thereon processor-executable instructions that when executed cause performance of operations, the operations comprising:

controlling a graphical user interface to display one or more content items in a content platform interface comprising:

a content item of the one or more content items; and a selectable input associated with transmitting a targeted response to the content item;

receiving, via the content platform interface, a selection of the selectable input associated with a request for transmitting the targeted response, comprising a response content item, as a response to the content item;

receiving a selection of the response content item for the targeted response;

responsive to receiving at least one of the selection of the selectable input associated with the request or the selection of the response content item for the targeted response;

analyzing a user database to identify a plurality of users, to which the content item was at least one of previously presented or previously targeted, based upon a plurality of assignments of the content item to the plurality of users, wherein the user database indicates that:

a first user, of the plurality of users, is linked to one or more first content items, comprising the content item, at least one of previously presented or previously targeted to the first user; and a second user is linked to one or more second content items at least one of previously presented or previously targeted to the second user; and transmitting, as the response to the content item, the targeted response comprising the response content item to a plurality of devices comprising a first device of the first user, wherein each device of the plurality of devices is associated with a user of the plurality of users to which the content item was at least one of previously presented or previously targeted.

19. The non-transitory machine readable medium of claim 18, the user database comprising at least one of
a user history database or a user targeting database.

20. The non-transitory machine readable medium of claim 18,
a first content item, of the one or more first content items, at least one of previously presented or previously targeted to the first user at a first time;
a second content item, of the one or more first content items, at least one of previously presented or previously targeted to the first user at a second time;
a third content item, of the one or more second content items, at least one of previously presented or previously targeted to the second user at a third time; and
a fourth content item, of the one or more second content items, at least one of previously presented or previously targeted to the second user at a fourth time.

* * * * *